US011214113B2

(12) United States Patent
Kato et al.

(10) Patent No.: US 11,214,113 B2
(45) Date of Patent: Jan. 4, 2022

(54) VEHICULAR AIR CONDITIONING DEVICE

(71) Applicant: DENSO CORPORATION, Kariya (JP)

(72) Inventors: Shinya Kato, Kariya (JP); Ryo Kobayashi, Kariya (JP); Yasuhiro Sekito, Kariya (JP); Tetsuya Kono, Kariya (JP); Yuki Tsumagari, Kariya (JP); Tomohide Shindo, Kariya (JP)

(73) Assignee: DENSO CORPORATION, Kariya (JP)

( * ) Notice: Subject to any disclaimer, the term of this patent is extended or adjusted under 35 U.S.C. 154(b) by 422 days.

(21) Appl. No.: 16/417,077

(22) Filed: May 20, 2019

(65) Prior Publication Data

US 2019/0270359 A1 Sep. 5, 2019

Related U.S. Application Data

(63) Continuation of application No. PCT/JP2017/038816, filed on Oct. 26, 2017.

(30) Foreign Application Priority Data

Nov. 23, 2016 (JP) .............................. JP2016-227365

(51) Int. Cl.
*B60H 1/00* (2006.01)
(52) U.S. Cl.
CPC ........... *B60H 1/00064* (2013.01); *B60H 1/00* (2013.01); *B60H 2001/00135* (2013.01)
(58) Field of Classification Search
CPC ...... B60H 1/00064; B60H 2001/00135; F04D 29/4206; F04D 29/4226
See application file for complete search history.

(56) References Cited

U.S. PATENT DOCUMENTS

| 5,390,728 A | * | 2/1995 | Ban | ..................... | B60H 1/00742 |
| | | | | | 165/202 |
| 6,192,698 B1 | * | 2/2001 | Kakehashi | ......... | B60H 1/00064 |
| | | | | | 165/203 |
| 2016/0144685 A1 | | 5/2016 | Ochiai et al. | | |
| 2016/0288609 A1 | | 10/2016 | Yamaoka et al. | | |

FOREIGN PATENT DOCUMENTS

JP 2015037926 A 2/2015
JP 2016011101 A 1/2016

* cited by examiner

*Primary Examiner* — Kenneth J Hansen
*Assistant Examiner* — Phillip Decker
(74) *Attorney, Agent, or Firm* — Harness, Dickey & Pierce, P.L.C.

(57) ABSTRACT

A vehicular air conditioning device includes an air conditioning case having first, second case introduction ports and first, second case discharge ports, and a fan. The first, second case discharge ports are offset upward and downward in an up-down direction relative to a rotation axis, respectively. A first inner guide surface of an inner guide plate is located on the one side of a second inner guide surface in the left-right direction. Air introduced through the first case introduction port is guided by the first inner guide surface to be drawn from a first passage into the fan, the air being blown upward to flow through the first case discharge port. Air introduced through the second case introduction port is guided by the second inner guide surface to be drawn from a second passage into the fan, the air being blown upward to flow through the second case discharge port.

7 Claims, 10 Drawing Sheets

VEHICULAR AIR CONDITIONING DEVICE

CROSS REFERENCE TO RELATED APPLICATIONS

The present application is a continuation application of International Patent Application No. PCT/JP2017/038816 filed on Oct. 26, 2017, which designated the United States and claims the benefit of priority from Japanese Patent Application No. 2016-227365 filed on Nov. 23, 2016. The entire disclosures of all of the above applications are incorporated herein by reference.

TECHNICAL FIELD

The present disclosure relates to a vehicular air conditioning device mounted on a vehicle.

BACKGROUND

A vehicular air conditioning device mounted on a vehicle to feed conditioned air to an interior of the vehicle is conventionally used.

The vehicular air conditioning device includes a fan disposed on the downstream of a plurality of air passages formed inside an air conditioning case, and includes a partition member disposed on each of the suction side and the blowing side of the fan to reduce mixture of airs flowing through the plurality of air passages.

SUMMARY

According to an aspect of the present disclosure, a vehicular air conditioning device mounted on a vehicle to feed conditioned air to an interior of the vehicle includes: an air conditioning case that includes a first case introduction port and a second case introduction port through each of which air is introduced, and a first case discharge port and a second case discharge port through each of which the introduced air is discharged; and a fan that includes blade portions arranged at intervals, and rotates about a rotation axis inside the air conditioning case to draw the air and blow out the air in a direction away from the rotation axis. The first case introduction port is offset to one side in a left-right direction of the vehicle relative to the second case introduction port, the first case discharge port is offset upward in an up-down direction of the vehicle relative to the rotation axis, and the second case discharge port is offset downward in the up-down direction of the vehicle relative to the rotation axis. The air conditioning case includes a partition plate disposed on an air flow upstream side of the fan, and an inner guide plate disposed inside the plurality of blade portions in a radial direction around the rotation axis. The partition plate partitions a space on an air flow upstream side of the fan into a first passage located on the one side of the partition plate in the left-right direction of the vehicle, and a second passage located on the other side of the partition plate in the left-right direction of the vehicle. The first passage communicates with the first case introduction port, and the second passage communicates with the second case introduction port. The inner guide plate has a first inner guide surface and a second inner guide surface, the first inner guide surface being located on the one side of the second inner guide plate in the left-right direction of the vehicle. The air introduced through the first case introduction port is guided by the first inner guide surface to be drawn from the first passage into the fan, the air being blown upward by the fan to flow through the first case discharge port. The air introduced through the second case introduction port is guided by the second inner guide surface to be drawn from the second passage into the fan, the air being blown downward by the fan to flow through the second case discharge port.

According to the vehicular air conditioning device, air passing through the first passage and blown from the fan flows toward the upper side in the up-down direction from the position where the fan is included in the up-down direction of the vehicle. Accordingly, the air blown from the fan flows in the first case discharge port side space with low flow resistance.

EMBODIMENTS

Figure 1:
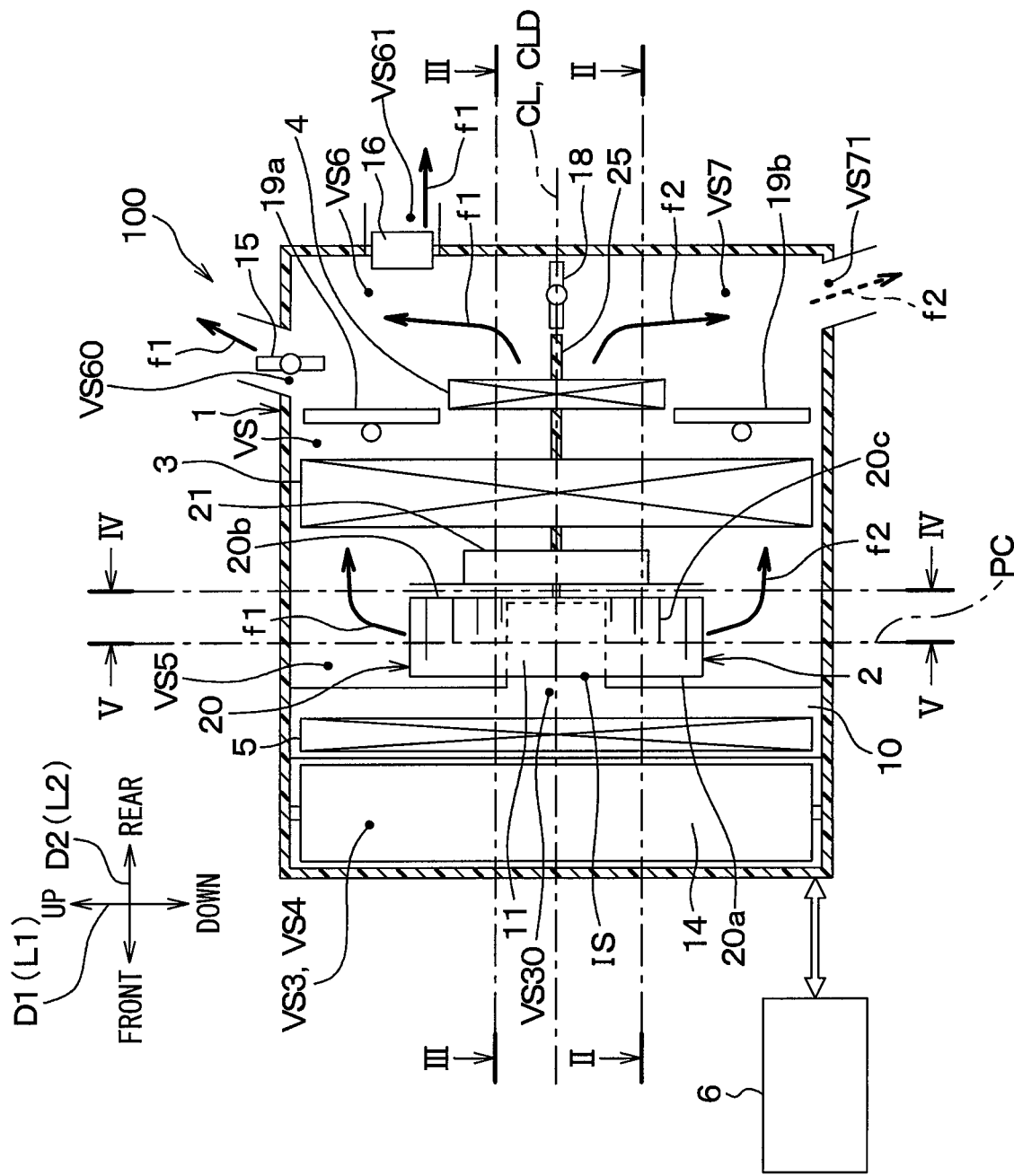
FIG. 1 is a diagram showing a cross-sectional configuration of a vehicular air conditioning device according to at least one embodiment of the present disclosure.

Embodiments according to the present disclosure are hereinafter described with reference to the drawings. In the respective embodiments described herein, identical or equivalent parts are given identical reference numbers.

First Embodiment

A vehicular air conditioning device 100 according to a first embodiment will be described with reference to FIGS.

1 to 12. The vehicular air conditioning device 100 is an air conditioner mounted on a vehicle to feed conditioned air to an interior of the vehicle.

In the following description, an up-down direction of the vehicle will be referred to as an up-down direction D1 of the vehicle, and a line extending in the up-down direction D1 of the vehicle will be referred to as an up-down line L1. A line perpendicular to the up-down line L1 is referred to as a front-rear line L2, and a direction of extension of the front-rear line L2 is referred to as a front-rear direction D2 of the vehicle. A line perpendicular to both the up-down line L1 and the front-rear line L2 is referred to as a left-right line L3, and a direction of extension of the left-right line L3 is referred to as a left-right direction D3 of the vehicle.

A cross section taken along a plane including the up-down line L1 and the left-right line L3 (i.e., plane parallel to up-down direction of vehicle and left-right direction of vehicle) and including an area where the fan 20 is located is referred to as a predetermined cross section PC. An acute angle formed by a rotation axis CL and the up-down line L1 is referred to as a first angle, an acute angle formed by the rotation axis CL and the front-rear line L2 is referred to as a second angle, and an acute angle formed by the rotation axis CL and the left-right line L3 is referred to as a third angle.

An acute angle formed by the up-down line L1 and a line represented by an inner guide plate 11 in the predetermined cross section PC is referred to as a fourth angle, and an acute angle formed by the left-right line L3 and the line represented by the inner guide plate 11 in the predetermined cross section PC is referred to as a fifth angle. Each of acute angles formed by the up-down line L1 and lines L4 and L5 represented by case wall surfaces 1a and 1b included in an air conditioning case 1 and surrounding a first case discharge port side space VS50 in the predetermined cross section PC is referred to as a sixth angle. Each of acute angles formed by the left-right line L3 and the lines L4 and L5 represented by the case wall surfaces 1a and 1b included in the air conditioning case 1 and surrounding the first case discharge port side space VS50 in the predetermined cross section PC is referred to as a seventh angle.

Each of acute angles formed by the up-down line L1 and case wall surfaces 1c and 1d included in the air conditioning case 1 and surrounding a second case discharge port side space VS51 in the predetermined cross section PC is referred to as an eighth angle. Each of acute angles formed by the left-right line L3 and the case wall surfaces 1c and 1d included in the air conditioning case 1 and surrounding the second case discharge port side space VS51 in the predetermined cross section PC is referred to as a ninth angle.

The vehicular air conditioning device 100 is disposed in a front part inside the vehicle, and constitutes a part of an air conditioning system including a refrigeration cycle constituted by a compressor, a condenser, and the like provided in an engine room, for example. As shown in FIG. 1, the vehicular air conditioning device 100 according to the present embodiment includes the air conditioning case 1, a blower 2, an evaporator 3, a heater core 4, a filter 5, and an electronic control device 6.

As shown in FIG. 1, the air conditioning case 1 is a housing member having a ventilation space VS through which air passes. The air conditioning case 1 is basically made of resin. The air conditioning case 1 includes a partition plate 10, the inner guide plate 11, revolving doors 12a, 12b, 13 to 16, 17a, 17b, and 18, and slide doors 19a and 19b. The air conditioning case 1 further includes case wall surfaces 1a, 1b, 1c, and 1d.

Figure 2:
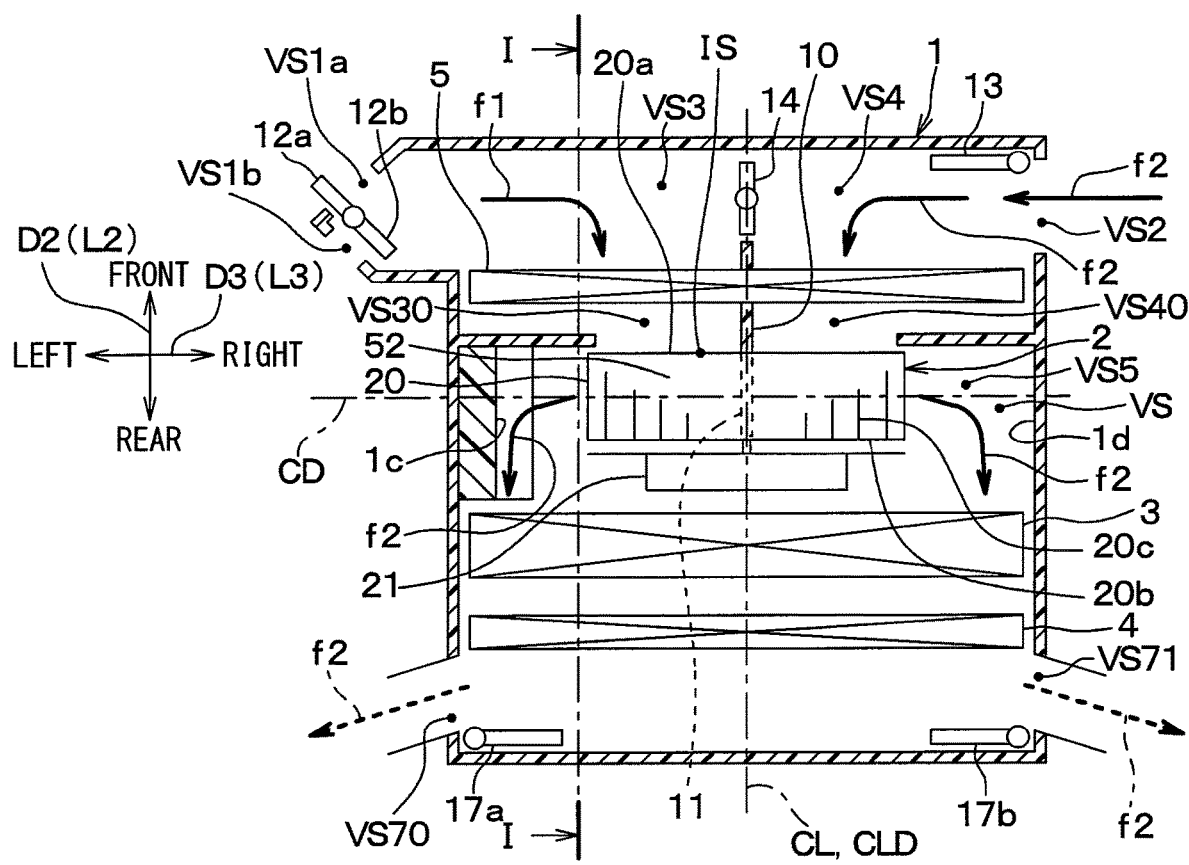
FIG. 2 is a diagram showing a configuration of a II-II cross section of the vehicular air conditioning device shown in FIG. 1.

As shown in FIG. 2, the ventilation space VS includes three case introduction ports VS1a, VS1b, and VS2 through each of which air outside the air conditioning case 1 is introduced. More specifically, the case introduction port VS1a is a space through which air outside the vehicle is introduced. Each of the case introduction ports VS1b and VS2 is a space through which air inside the vehicle is introduced. The ventilation space VS includes a first passage VS3 and a second passage VS4 formed by partitioning a part of the ventilation space VS by the partition plate 10. The case introduction ports VS1a and VS1b are located on the left side (i.e., one side) of the partition plate 10, while the case introduction port VS2 is located on the right side (i.e., the other side) of the partition plate 10. The case introduction ports VS1a and VS1b communicate with the first passage VS3. The case introduction port VS2 communicates with the second passage VS4. The case introduction port VS1a corresponds to a first case introduction port. The case introduction port VS2 corresponds to a second case introduction port. The first passage VS3 is located on the left side (i.e., one side) of the partition plate 10 in the left-right direction D3 of the vehicle, while the second passage VS4 is located on the right side (i.e., the other side) of the partition plate 10 in the left-right direction D3 of the vehicle.

The partition plate 10 is a plate member which partitions a part of the ventilation space VS into the first passage VS3 and the second passage VS4.

As shown in FIG. 2, the revolving doors 12a and 12b are disposed in the case introduction ports VS1a and VS1b, respectively. The revolving door 13 is disposed in the second case introduction port VS2. Each of the revolving doors 12a, 12b, and 13 corresponds to an introduced air amount adjusting unit.

As shown in FIG. 1, the ventilation space VS includes a fan space VS5, a first case discharge port VS6, and a second case discharge port VS7. The fan space VS5 is a space which communicates with the first passage VS3 and the second passage VS4, and contains the fan 20. The fan space VS5 is a space surrounded by the case wall surfaces 1a, 1b, 1c, and 1d of the air conditioning case 1. The first case discharge port VS6 is a space through which air having passed through the first passage VS3 and the fan space VS5 is discharged to the outside of the air conditioning case 1. The second case discharge port VS7 is a space through which air having passed through the second passage VS4 and the fan space VS5 is discharged to the outside of the air conditioning case 1. As shown in FIG. 1, the first case discharge port VS6 and the second case discharge port VS7 are partitioned in the up-down direction by a blowing side partition plate 25. The blowing side partition plate 25 is a flat-plate-shaped member disposed on the air flow downstream side of the fan 20. The first case discharge port VS6 is positioned above the blowing side partition plate 25 in the up-down direction of the vehicle. The second case discharge port VS7 is positioned below the blowing side partition plate 25 in the up-down direction of the vehicle. Accordingly, as shown in FIG. 1, the first case discharge port VS6 is located at a position shifted at least upward in the up-down direction D1 of the vehicle from the rotation axis CL of the fan 20. Meanwhile, as shown in FIG. 1, the second case discharge port VS7 is located at a position shifted at least downward in the up-down direction D1 of the vehicle from the rotation axis CL of the fan 20. The first case discharge port VS6 may be located at a position shifted at least upward in the up-down direction D1 of the vehicle from the fan 20. The second case discharge port VS7 may be located at a position shifted at least downward in the up-down direction D1 of the vehicle from the rotation axis CL of the fan 20.

According to the present embodiment, a fan side first passage portion VS30 is disposed on the left side of a fan side second passage portion VS40 in any of the predetermined cross section PC as shown in FIG. 1. The fan side first passage portion VS30 is a portion included in the first passage VS3 and connected to the fan space VS5. The fan side second passage portion VS40 is a portion included in the second passage VS4 and connected to the fan space VS5.

According to the present embodiment, the partition plate 10 partitions the first passage portion VS30 and the fan side second passage portion VS40 such that the first passage portion VS30 is located on the left side of the fan side second passage portion VS40 in the left-right direction D3 of the vehicle in any of the predetermined cross section PC as shown in FIG. 1.

Figure 4:
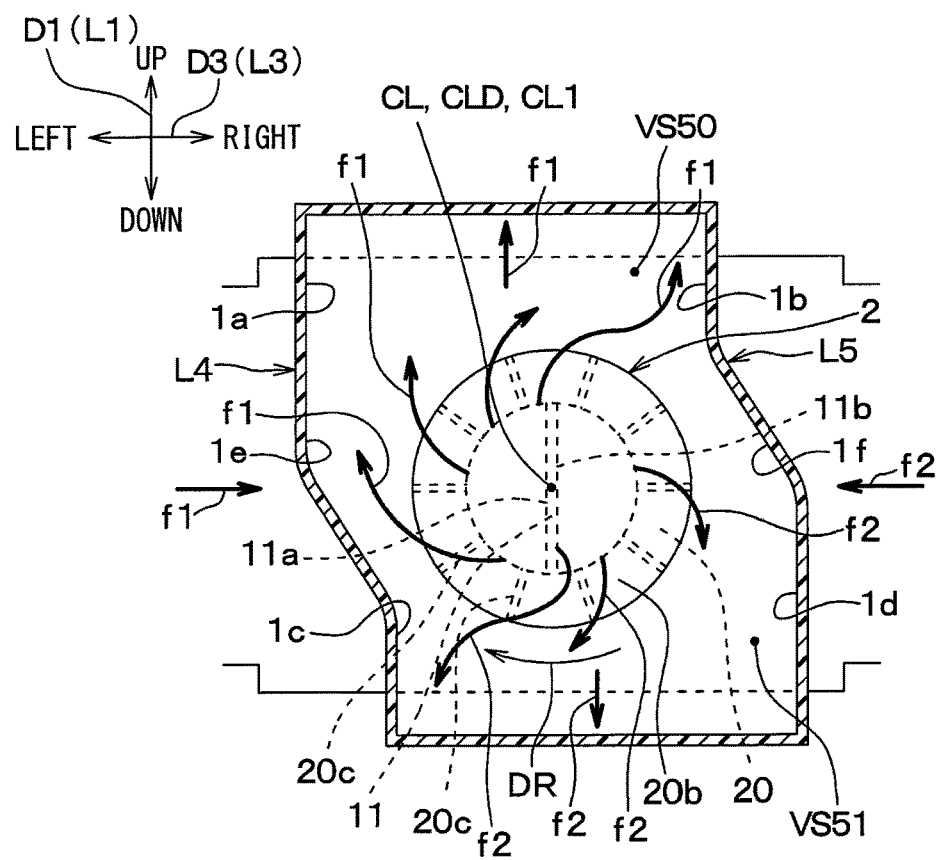
FIG. 4 is a diagram showing a configuration of a IV-IV cross section of the vehicular air conditioning device shown in FIG. 1.
Figure 5:
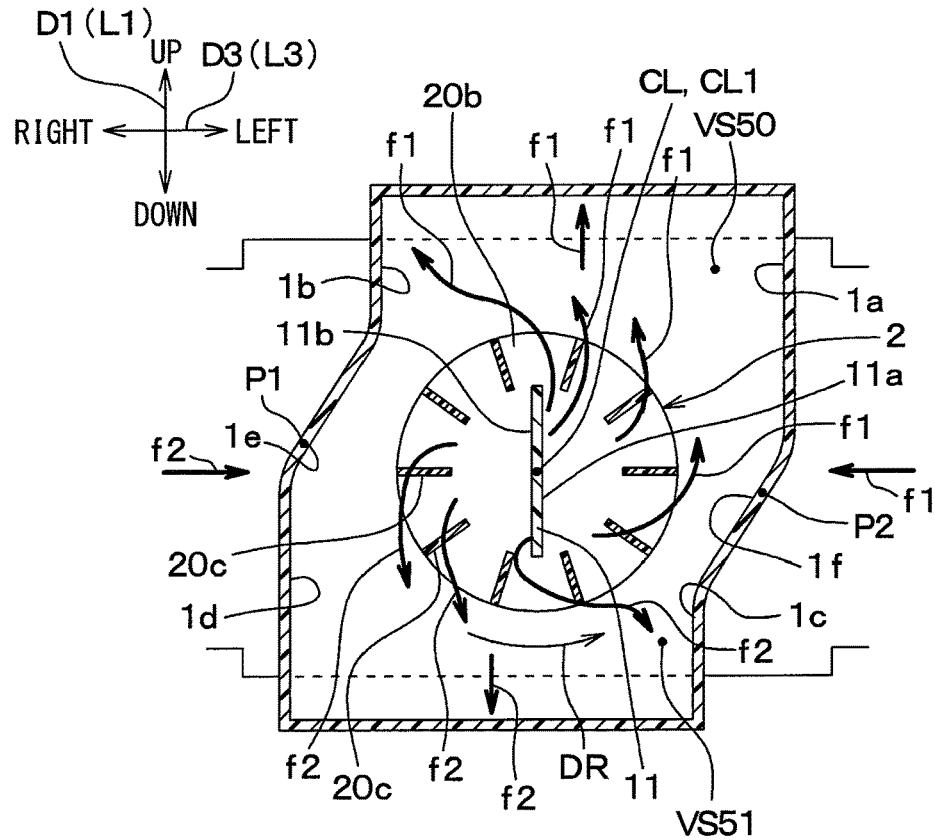
FIG. 5 is a diagram showing a configuration of a V-V cross section of the vehicular air conditioning device shown in FIG. 1.

As shown in FIGS. 4 and 5, a portion included in the fan space VS5 and connected to the first case discharge port VS6 is the first case discharge port side space VS50 in any of the predetermined cross section PC. As shown in FIGS. 4 and 5, the first case discharge port side space VS50 is located above the fan 20 in the up-down direction of the vehicle. The case wall surfaces 1a and 1b of the air conditioning case 1 surround the first case discharge port side space VS50. More specifically, the case wall surfaces 1a and 1b extend upward from positions P1 and P2 in each of which the fan 20 is included in the up-down direction D1 of the vehicle in a state that both ends of the first case discharge port side space VS50 in the left-right direction D3 of the vehicle are sandwiched between the case wall surfaces 1a and 1b such that the sixth angle becomes smaller than the seventh angle.

The sixth angle is an acute angle formed by the up-down line L1 and each of the lines L4 and L5 represented by the case wall surfaces 1a and 1b of the air conditioning case 1 surrounding the first case discharge port side space VS50 in the corresponding predetermined cross section PC. The seventh angle is an acute angle formed by the left-right line L3 and each of the lines L4 and L5 represented by the case wall surfaces 1a and 1b of the air conditioning case 1 surrounding the first case discharge port side space VS50 in the corresponding predetermined cross section PC.

The case wall surfaces 1a and 1b surrounding the first case discharge port side space VS50 are therefore formed along the up-down line L1. Unlike comparative examples shown in FIGS. 6 and 7, each of the case wall surfaces 1a and 1b surrounding the first case discharge port side space VS50 of the present embodiment does not have a portion formed along the left-right line L3.

As shown in FIGS. 4 and 5, the second case discharge port side space VS51 is a portion included in the fan space VS5, constituted by a portion other than the first case discharge port side space VS50, and connected to the second case discharge port VS7 in any of the predetermined cross section PC. As shown in FIGS. 4 and 5, the second case discharge port side space VS51 is located below the fan 20 in the up-down direction of the vehicle. The case wall surfaces 1c and 1d of the air conditioning case 1 surround the second case discharge port side space VS51. More specifically, the case wall surfaces 1c and 1d extend downward in the up-down direction D1 of the vehicle from the positions P1 and P2 in each of which the fan 20 is included in a state that both ends of the second case discharge port side space VS51 in the left-right direction D3 of the vehicle are sandwiched between the case wall surfaces 1c and 1d such that the eighth angle becomes smaller than the ninth angle.

The eighth angle is an acute angle formed by the up-down line L1 and each of the case wall surfaces 1c and 1d included in the air conditioning case 1 and surrounding the second case discharge port side space VS51 in the corresponding predetermined cross section PC. The ninth angle is an acute angle formed by the left-right line L3 and the case wall surfaces 1c and 1d included in an air conditioning case 1 and surrounding the second case discharge port side space VS51 in the corresponding predetermined cross section PC. The case wall surfaces 1c and 1d surrounding the second case discharge port side space VS51 are therefore formed along the up-down line L1. Unlike the comparative examples shown in FIGS. 6 and 7, each of the case wall surfaces 1c and 1d surrounding the second case discharge port side space VS51 of the present embodiment does not have a portion formed along the left-right line L3.

An arrow DR in each of FIGS. 4 and 5 indicates a rotation direction of the fan 20. More specifically, the fan 20 rotates clockwise in FIG. 4, and counterclockwise in FIG. 5.

As shown in FIGS. 4 and 5, boundary portions 1e and 1f between the case wall surfaces 1a and 1b surrounding the first case discharge port side space VS50, and the case wall surfaces 1c and 1d surrounding the second case discharge port side space VS51 are located in the vicinity of the positions P1 and P2. Each of the boundary portions 1e and 1f functions as a nose portion which separates air guided by a first inner guide surface 11a from air guided by a second inner guide surface 11b.

More specifically, the boundary portions 1e and 1f extend such that the tenth angle becomes smaller than the eleventh angle in any of the predetermined cross section PC. The tenth angle is an acute angle formed by each of the boundary portions 1e and 1f and the up-down line L1 in the corresponding predetermined cross section PC. The eleventh angle is an acute angle formed by each of the boundary portions 1e and 1f and the left-right line L3 in the predetermined cross section PC. The boundary portions 1e and 1f are therefore formed along the up-down line L1.

As shown in FIGS. 1 to 5, the inner guide plate 11 is a member having a flat plate shape. As shown in FIGS. 4 and 5, the inner guide plate 11 has the first inner guide surface 11a which guides air passing through the first passage VS3 and blown from the fan 20 toward the first case discharge port VS6. The inner guide plate 11 has the second inner guide surface 11b which guides air passing through the second passage VS4 and blown from the fan 20 toward the second case discharge port VS7.

Accordingly, the inner guide plate 11 guides the outside air passing through the first passage VS3 and blown from the fan 20 toward the first case discharge port VS6 by using the first inner guide surface 11a. The inner guide plate 11 also guides the inside air passing through the second passage VS4 and blown from the fan toward the second case discharge port VS7 by using the second inner guide surface 11b. The first inner guide surface 11a is located on the left side of the second inner guide surface 11b in the left-right direction D3 of the vehicle.

As shown in FIGS. 4 and 5, the inner guide plate 11 extends such that the fourth angle becomes smaller than the fifth angle in the predetermined cross section PC. The fourth angle is an acute angle formed by the up-down line L1 and the line represented by the inner guide plate 11 in the predetermined cross section PC. The fifth angle is an acute angle formed by the left-right line L3 and the line represented by the inner guide plate 11 in the predetermined cross section PC. The inner guide plate 11 is therefore formed along the up-down line L1. Accordingly, an acute angle formed by the up-down direction of the vehicle and a line passing through the rotation axis CL and passing through a radially outer end of the inner guide plate 11 (i.e., fourth angle) is smaller than the fifth angle. The fifth angle is an acute angle formed by the left-right direction of the vehicle and the line passing through the rotation axis CL and passing through the radially outer end of the inner guide plate 11.

As shown in FIG. 1, the inner guide plate 11 is formed integrally with the partition plate 10. More specifically, the inner guide plate 11 is connected to a fan 20 side end of the partition plate 10 and integrated with this end.

As shown in FIGS. 4 and 5, the inner guide plate 11 is disposed in the fan space VS5 on the inside (i.e., on the side close to the rotation axis CL) of a plurality of blade portions 20c in a radial direction DD of the fan 20. The radial direction DD of the fan 20 is a direction which passes through a point CL1 on the rotation axis CL, and extends perpendicularly to the rotation axis CL.

The revolving door 12a is a door which revolves to open and close the case introduction port VS1a. The vehicular air conditioning device 100 according to the present embodiment is capable of increasing or decreasing an amount of air introduced into the air conditioning case 1 through the case introduction port VS1a in accordance with revolution of the revolving door 12a. Accordingly, the revolving door 12a corresponds to an introduced air amount adjusting unit which adjusts an amount of air introduced from the outside of the air conditioning case 1. The vehicular air conditioning device 100 according to the first embodiment is configured to introduce the outside air (i.e., air outside the vehicle) through the case introduction port VS1a when the revolving door 12a comes into a state for opening the case introduction port VS1a.

The revolving door 12b is a door which revolves to open and close the case introduction port VS1b. The vehicular air conditioning device 100 according to the present embodiment is capable of increasing or decreasing an amount of air introduced into the air conditioning case 1 through the case introduction port VS1b in accordance with revolution of the revolving door 12b. Accordingly, the revolving door 12b corresponds to an introduced air amount adjusting unit which adjusts an amount of air introduced from the outside of the air conditioning case 1. The vehicular air conditioning device 100 according to the first embodiment is configured to introduce the inside air (i.e., air inside the vehicle) through the case introduction port VS1b when the revolving door 12b comes into a state for opening the case introduction port VS1b.

The revolving door 13 is a door which revolves to open and close the case introduction port VS2. The vehicular air conditioning device 100 according to the present embodiment is capable of increasing or decreasing an amount of air introduced into the air conditioning case 1 through the case introduction port VS2 in accordance with revolution of the revolving door 13. Accordingly, the revolving door 13 corresponds to an introduced air amount adjusting unit which adjusts an amount of air introduced from the outside of the air conditioning case 1. The vehicular air conditioning device 100 according to the first embodiment is configured to introduce the inside air (i.e., air inside the vehicle) through the case introduction port VS2 when the revolving door 13 comes into a state for opening the case introduction port VS2.

The revolving door 14 is a door which revolves to switch a degree of communication between the first passage VS3 and the second passage VS4. Accordingly, the revolving door 14 corresponds to a switching unit which switches the degree of communication between the first passage VS3 and the second passage VS4.

The revolving door 15 is a door which revolves to open and close a defroster discharge port VS60 of the first case discharge port VS6. The defroster discharge port VS60 is a space through which conditioned air is discharged toward a vehicle interior side surface of a windshield of the vehicle.

Each of the revolving doors 16 is a door which revolves to open and close a face discharge port VS61 of the first case discharge port VS6. The face discharge port VS61 is a space through which conditioned air is discharged toward a space in an upper part of the interior of the vehicle (i.e., toward upper body of occupant).

The revolving door 17a is a door which revolves to open and close a foot discharge port VS70 of the second case discharge port VS7. The foot discharge port VS70 is a space through which conditioned air is discharged toward a space in a lower part of the interior of the vehicle (i.e., toward lower body of occupant) on the left side (i.e., on front passenger seat side) of the vehicle.

The revolving door 17b is a door which revolves to open and close a foot discharge port VS71 of the second case discharge port VS7. The foot discharge port VS71 is a space through which conditioned air is discharged toward a space in a lower part of the interior of the vehicle (i.e., toward lower body of occupant) on the right side of the vehicle (i.e., on driver's seat side).

The revolving door 18 is a door which revolves to switch a degree of communication between the first case discharge port VS6 and the second discharge port VS7. Accordingly, the revolving door 18 corresponds to a switching unit which switches the degree of communication between the first case discharge port VS6 and the second case discharge port VS7.

The sliding door 19a is a door which is slidable, and is disposed in the first case discharge port VS6 between the evaporator 3 and the heater core 4. The slide door 19a slides to increase or decrease an amount of air passing through the first case discharge port VS6, i.e., an amount of air which passes through a passage extending through the heater core 4, and an amount of air which passes through a passage not reaching the heater core 4 (i.e., bypass passage).

The sliding door 19b is a door which is slidable, and is disposed in the second case discharge port VS7 between the evaporator 3 and the heater core 4. The slide door 19b slides to increase or decrease an amount of air passing through the second case discharge port VS7, i.e., an amount of air which passes through the passage extending through the heater core 4, and an amount of air which passes through the passage not reaching the heater core 4 (i.e., bypass passage).

The blower 2 is a centrifugal type electric blower. As shown in FIG. 1, the blower 2 includes the fan 20 and a driving motor 21. The blower 2 is disposed in the ventilation space VS. More specifically, the blower 2 is disposed in the ventilation space VS on the air flow downstream side of the first passage VS3 and the second passage VS4, and on the air flow upstream side of the evaporator 3.

As shown in FIG. 1, the fan 20 includes a top plate portion 20a, a bottom plate portion 20b, and the plurality of blade portions 20c. The fan 20 disposed in the ventilation space VS rotates to perform a function of sucking air in a direction CLD of the rotation axis CL, and blowing out air in a centrifugal direction CD around the rotation axis CL. In this manner, the fan 20 blows air away from the rotation axis CL. According to the present embodiment, the rotation axis CL of the fan 20 extends such that the second angle becomes smaller than each of the first angle and the third angle. The first angle is an acute angle formed by the rotation axis CL and the up-down line L1. The second angle is an acute angle formed by the rotation axis CL and the front-rear line L2. The third angle is an acute angle formed by the rotation axis CL and the left-right line L3. The fan 20 is therefore provided such that the rotation axis CL extends along the front-rear line L2.

As shown in FIG. 1, the top plate portion 20a is disposed on one side of the bottom plate portion 20b in the front-rear direction D2 of the vehicle. A fan introduction port IS is formed in the top plate portion 20a to introduce air having passed through the first passage VS3 and air having passed through the second passage VS4 into a space surrounded by the bottom plate portion 20b and the top plate portion 20a through the fan introduction port IS.

As shown in FIG. 1, the plurality of blade portions 20c are surrounded by the top plate portion 20a and the bottom plate portion 20b. More specifically, the plurality of blade portions 20c are disposed with a clearance left between each other in the rotational direction DR of the fan 20 in the space surrounded by the bottom plate portion 20b and the top plate portion 20a. Each of the plurality of blade portions 20c is connected to each of the bottom plate portion 20b and the top plate portion 20a.

The driving motor 21 is an electric motor which rotates the fan 20.

The evaporator 3 is a cooling heat exchanger for cooling air passing through the ventilation space VS by heat exchange between this air and a refrigerant circulating inside the evaporator 3. As shown in FIG. 1, the evaporator 3 is disposed in the ventilation space VS on the air flow downstream side of the first passage VS3, the second passage VS4, and the fan 20, and on the air flow upstream side of the heater core 4. The evaporator 3 is so disposed as to come into contact with each of the first case discharge port VS6 and the second case discharge port VS7.

The heater core 4 is a heating heat exchanger for heating air passing through the heater core 4 by heat exchange between this air and engine cooling water which is warm water circulating inside the heater core 4. As shown in FIG. 1, the heater core 4 is disposed on the air flow downstream side of the evaporator 3 in the ventilation space VS, and on the air flow upstream side of the defroster discharge port VS60, the face discharge port VS61, the foot discharge port VS70, and the foot discharge port VS71. The heater core 4 is so disposed as to come into contact with each of the first case discharge port VS6 and the second case discharge port VS7.

The filter 5 is a filter which has functions such as dust prevention, deodorization, and sterilization. As shown in FIG. 1, the filter 5 is disposed on the air flow downstream side of the case introduction ports VS1a, VS1b, and VS2 in the ventilation space VS, and on the air flow upstream side of the first passage VS3 and the second passage VS4.

The electronic control device 6 includes a known microcomputer constituted by a central processing unit (CPU), a read-only memory (ROM), a random-access memory (RAM), and the like, and peripheral circuits of the microcomputer, and executes various control processes under a computer program prestored in the ROM or the like. Each of the ROM and the RAM is a non-transitory tangible storage medium. Actuators are respectively connected to the doors 12a, 12b, 13 to 16, 17a, 17b, 18, 19a and 19b disposed in the air conditioning case 1 to drive the corresponding doors. The electronic control device 6 outputs operation signals to the actuators to rotate or slide the corresponding doors. The electronic control device 6 also outputs operation signals to a not-shown compressor and the blower 2 which circulate a refrigerant to the evaporator 3. The electronic control unit 6 further executes various air conditioning control for the vehicular air conditioning device 100. For example, the electronic control device 6 switches the operation state of the vehicular air conditioning device 100 to one of a plurality of blowing modes. For example, the plurality of blowing modes include an inside-outside air double layer mode, an outside air single layer mode, and an inside air single layer mode. These modes will be described below.

Figure 3:
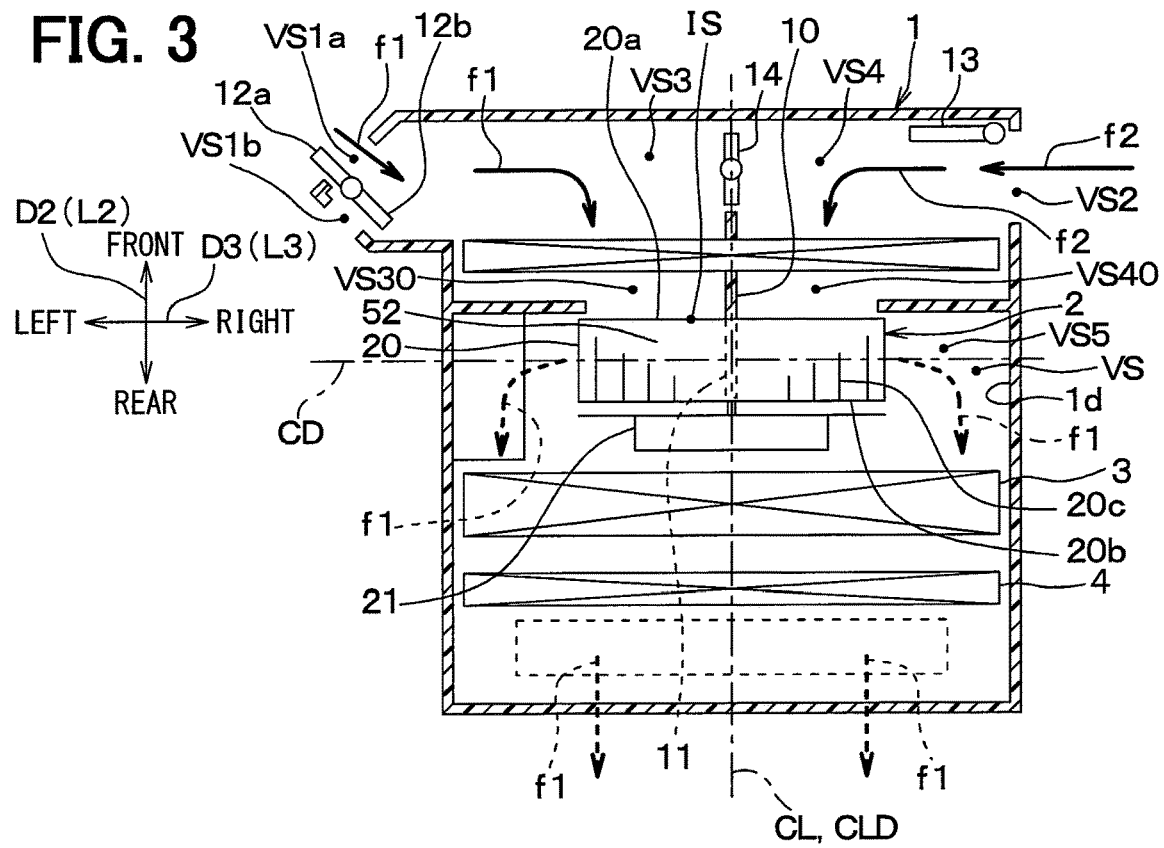
FIG. 3 is a diagram showing a configuration of a III-III cross section of the vehicular air conditioning device shown in FIG. 1.

For example, a state shown in FIGS. 1 to 3 is produced in the inside-outside air double layer mode. More specifically, in the inside-outside air double layer mode, the revolving door 12a opens the case introduction port VS1a, the revolving door 12b closes the case introduction port VS1b, and the revolving door 13 opens the case introduction port VS2 as shown in FIGS. 1 to 3. The revolving door 14 comes into a closed state, that is, a state that the first passage VS3 and the second passage VS4 do not communicate with each other.

The revolving door 15 opens the defroster discharge port VS60, while the revolving door 16 opens the face discharge port VS61. The revolving door 17a opens the foot discharge port VS70, while the revolving door 17b opens the foot discharge port VS71. The revolving door 18 comes into a closed state, that is, a state that the first case discharge port VS6 and the second case discharge port VS7 do not communicate with each other.

As indicated by arrows f1 in FIGS. 1 to 3, the outside air introduced from the case introduction port VS1a flows through the case introduction port VS1a, the first passage VS3, the fan space VS5, and the first case discharge port VS6 in this order. Thereafter, the outside air flows into the interior of the vehicle via the defroster discharge port VS60 or the face discharge port VS61. As indicated by arrows f2 in FIGS. 1 to 3, the inside air introduced through the case introduction port VS2 flows through the case introduction port VS2, the second passage VS4, the fan space VS5, and the second case discharge port VS7 in this order. Thereafter, this inside air flows into the interior of the vehicle via the foot discharge port VS70 or the foot discharge port VS71.

Figure 8:
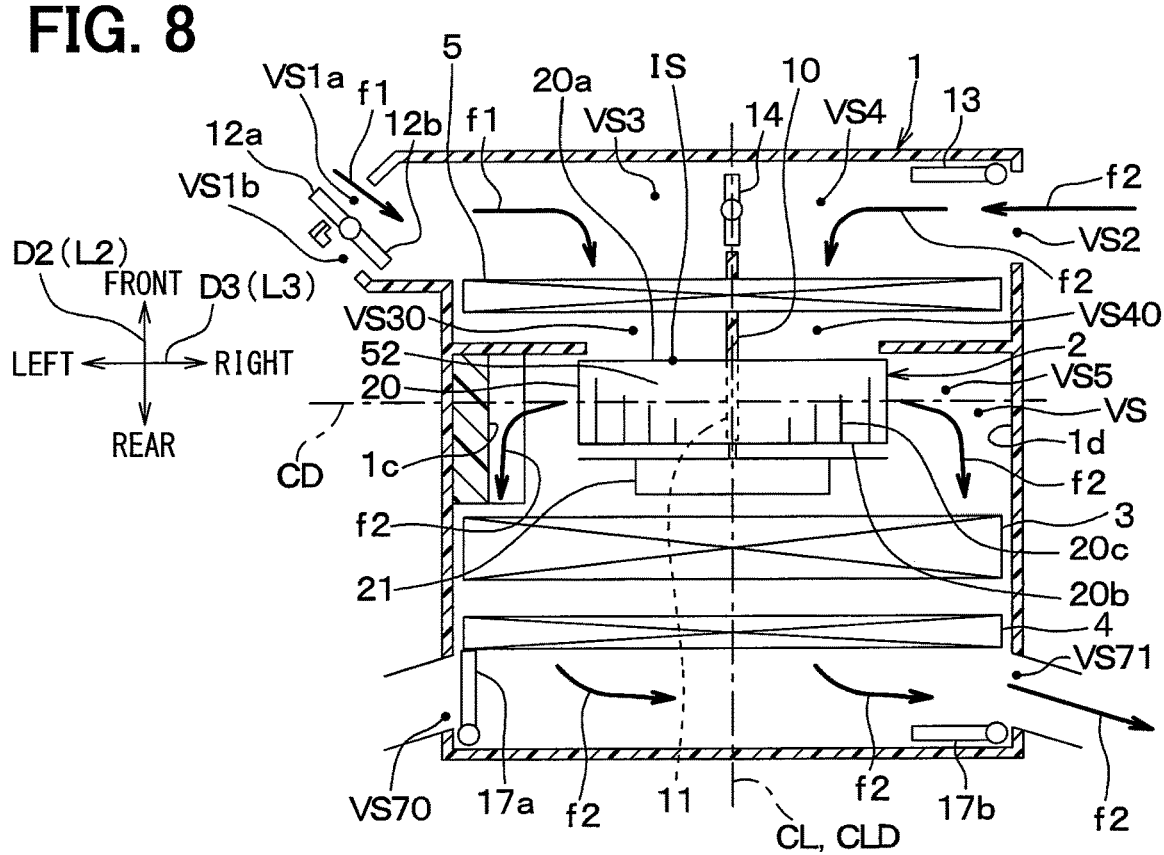
FIG. 8 is a diagram showing a blowing mode of the vehicular air conditioning device shown in FIG. 1 in correspondence with the II-II cross section as a mode different from the mode of FIG. 2.

FIG. 8 shows a case where the revolving door 17a closes the foot discharge port VS70 in the inside-outside air double layer mode shown in FIGS. 1 to 3. In this case, air does not flow into the interior of the vehicle from the foot discharge port VS70 side (i.e., front passenger seat side), but flows only from the foot discharge port VS71 side (i.e., driver's seat side) into the interior of the vehicle.

Figure 9:
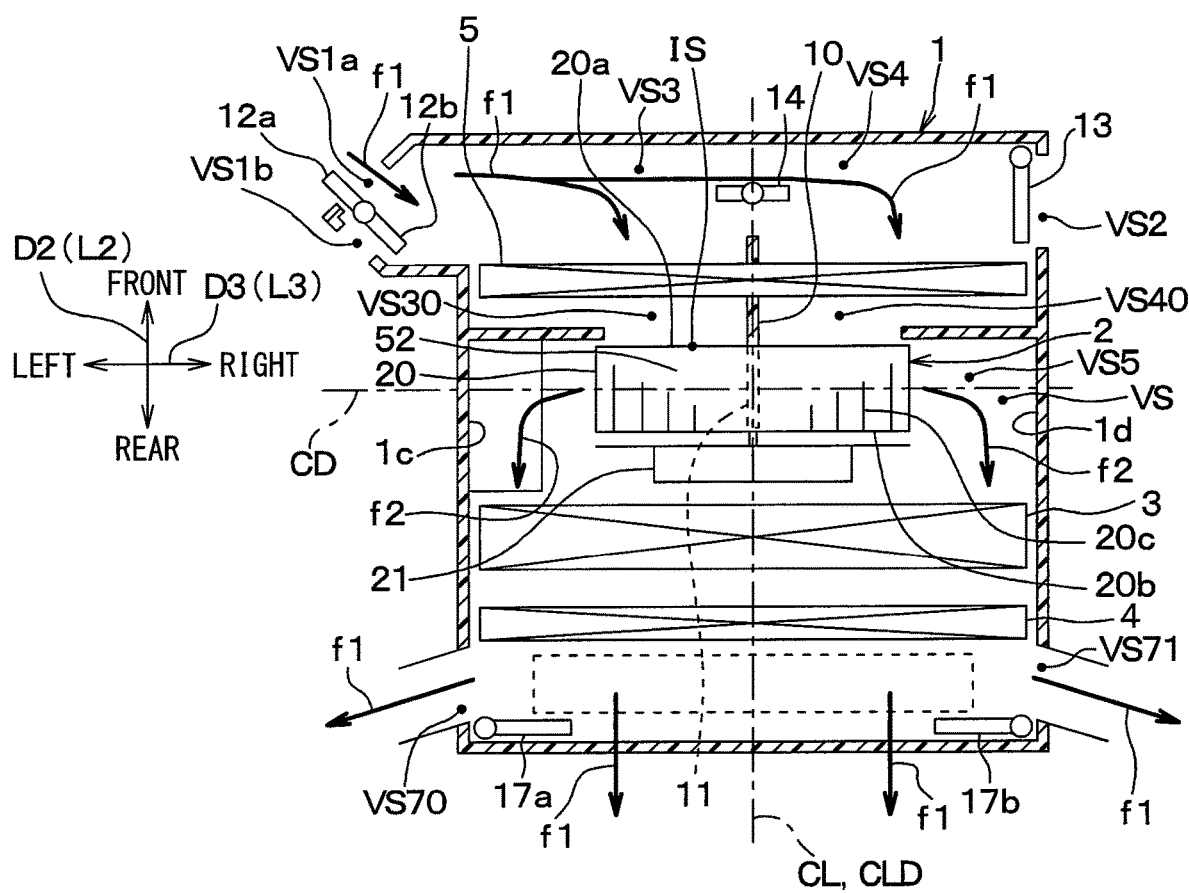
FIG. 9 is a diagram showing an outside air single layer mode of the vehicular air conditioning device shown in FIG. 1 in correspondence with the III-III cross section.

In the outside air single layer mode, a state as shown in FIG. 9 is produced. More specifically, in the outside air single layer mode, the revolving door 12a opens the case introduction port VS1a, the revolving door 12b closes the case introduction port VS1b, and the revolving door 13 closes the case introduction port VS2 as shown in FIG. 9. The revolving door 14 comes into an opened state, that is, a state that the first passage VS3 and the second passage VS4 communicate with each other.

The revolving door 15 opens the defroster discharge port VS60, while the revolving door 16 opens the face discharge port VS61. The revolving door 17a closes the foot discharge port VS70, while the revolving door 17b closes the foot discharge port VS71. The revolving door 18 comes into an opened state, that is, a state that the first case discharge port VS6 and the second case discharge port VS7 communicate with each other.

As indicated by the arrows f1 in FIG. 9, the outside air introduced from the case introduction port VS1a flows through the case introduction port VS1a, the first passage VS3, the fan space VS5, and the first case discharge port VS6 or the second case discharge port VS7 in this order. Thereafter, the outside air flows into the interior of the vehicle via the defroster discharge port VS60 or the face discharge port VS61.

In the outside air single layer mode shown in FIG. 9, the revolving door 16 may close the face discharge port VS61. In addition, in the outside air single layer mode shown in FIG. 9, the revolving door 17a may open the foot discharge port VS70, while the revolving door 17b may open the foot discharge port VS71.

Figure 10:
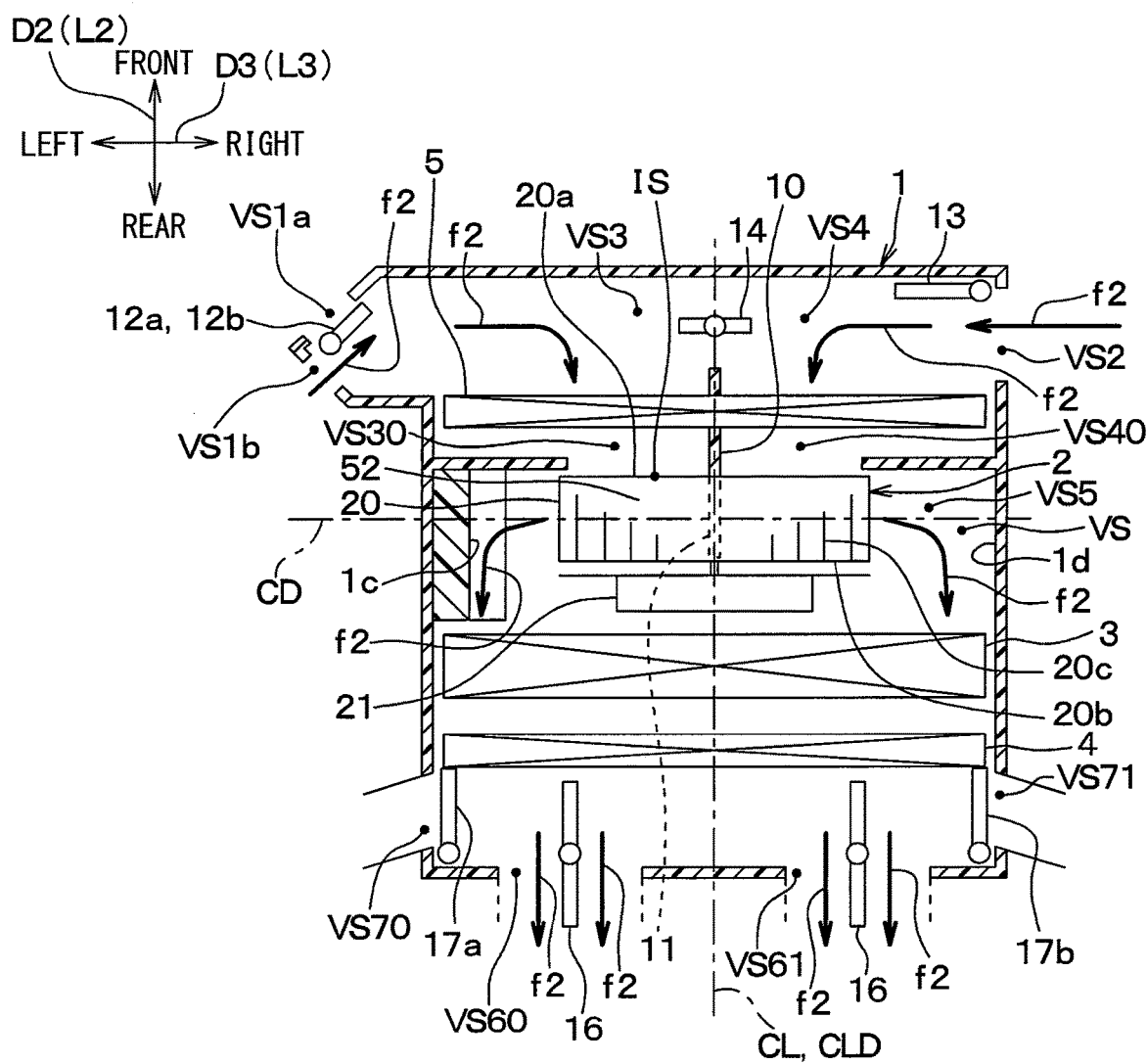
FIG. 10 is a diagram showing the outside air single layer mode of the vehicular air conditioning device shown in FIG. 1 in correspondence with the III-III cross section.

In the inside air single layer mode, a state shown in FIG. 10 is produced. More specifically, in the inside air single layer mode, the revolving door 12a closes the case introduction port VS1a, the revolving door 12b opens the case introduction port VS1b, and the revolving door 13 closes the case introduction port VS2 as shown in FIG. 10. The revolving door 14 comes into an opened state, that is, a state that the first passage VS3 and the second passage VS4 communicate with each other.

The revolving door 15 closes the defroster discharge port VS60, while the revolving door 16 opens the face discharge port VS61. The revolving door 17a closes the foot discharge port VS70, while the revolving door 17b closes the foot discharge port VS71. The revolving door 18 comes into an opened state, that is, a state that the first case discharge port VS6 and the second case discharge port VS7 communicate with each other.

In this condition, the inside air introduced from the case introduction ports VS1b and VS2 flows as indicated by the arrows f2 in FIG. 10. More specifically, this inside air flows through the case introduction port VS1b or the case introduction port VS2, the first passage VS3 or the second passage VS4, the fan space VS5, and the first case discharge port VS6 or the second case discharge port VS7 in this order, and flows into the interior of the vehicle via the face discharge port VS61.

In the inside air single layer mode shown in FIG. 10, the revolving door 16 may close the face discharge port VS61. In addition, in the inside air single layer mode shown in FIG. 10, the revolving door 17a may open the foot discharge port VS70, while the revolving door 17a may close the foot discharge port VS70. The revolving door 17b may close the foot discharge port VS71.

Figure 11:
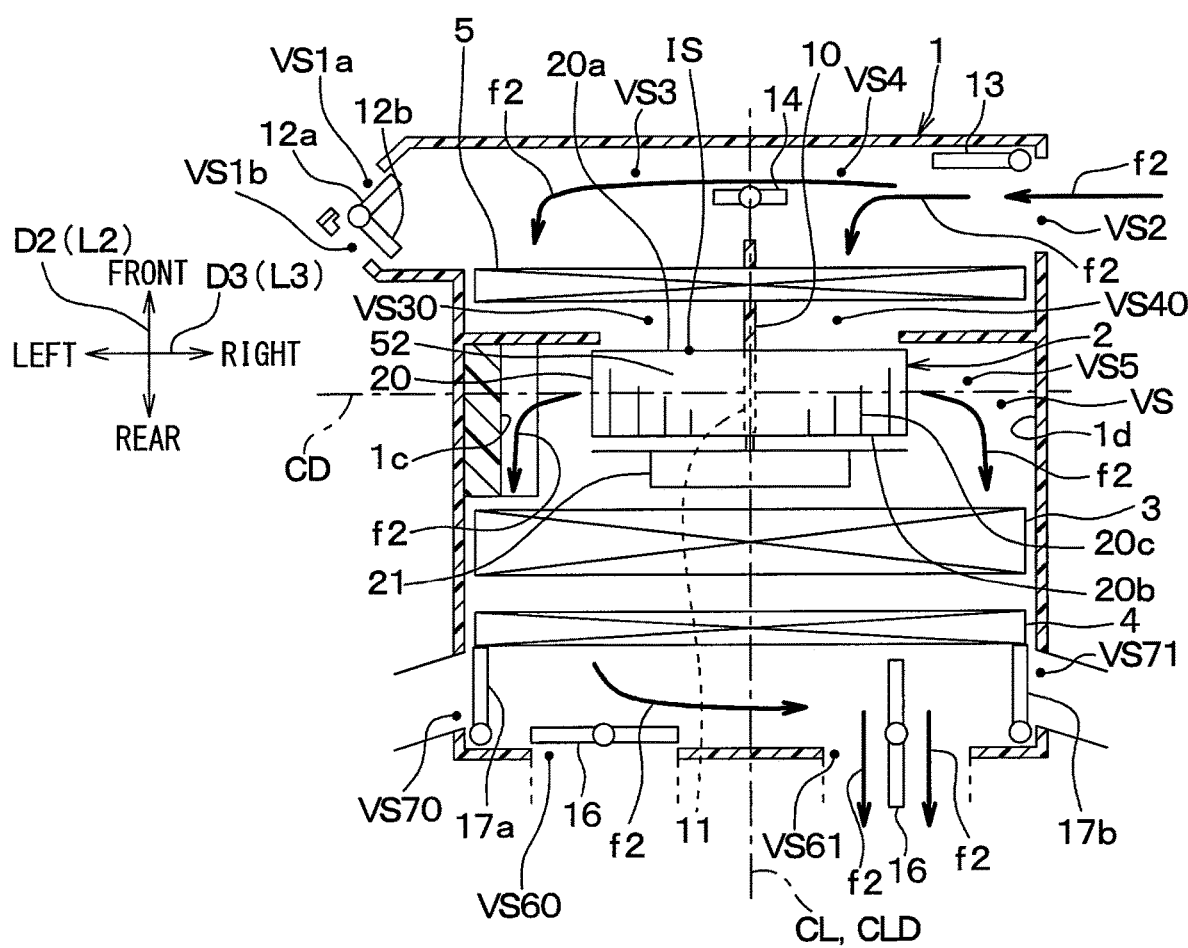
FIG. 11 is a diagram showing an inside air single layer mode of the vehicular air conditioning device shown in FIG. 1 in correspondence with the III-III cross section.

FIG. 11 shows a case where the revolving door 16 on the left side (i.e., front passenger seat side) closes the face discharge port VS61 in the inside-outside air double layer mode shown in FIG. 10. In addition, the revolving door 12b closes the case introduction port VS1b. In this case, air does not flow into the interior of the vehicle from the face discharge port VS61 on the left side (i.e., front passenger seat side), but flows into the interior of the vehicle only from the face discharge port VS61 on the right side (i.e., driver's seat side).

Figure 12:
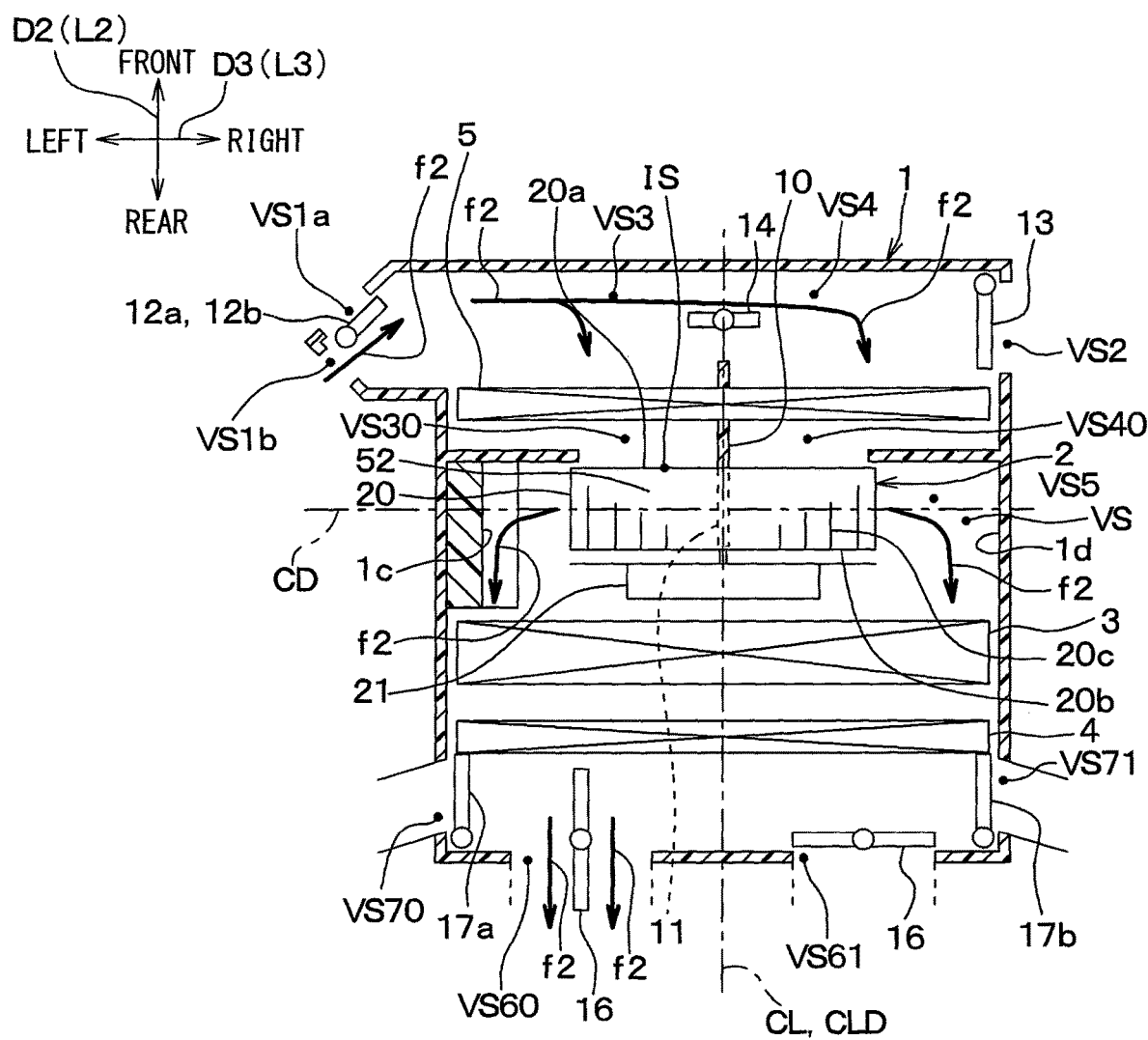
FIG. 12 is a diagram showing an inside air single layer mode of the vehicular air conditioning device shown in FIG. 1 in correspondence with the III-III cross section as a blowing mode different from the mode of FIG. 11.

FIG. 12 shows a case where the revolving door 16 on the right side (i.e., driver's seat side) closes the face discharge port VS61 in the inside-outside air double layer mode shown in FIG. 10. The revolving door 13 opens the case introduction port VS2. In this case, air does not flow into the interior of the vehicle from the face discharge port VS61 on the left side (i.e., front passenger seat side), but flows into the interior of the vehicle only from the face discharge port VS61 on the left side (i.e., front passenger seat side).

As described above, the inner guide plate 11 of the vehicular air conditioning device 100 according to the present embodiment extends such that the fourth angle becomes smaller than the fifth angle in the predetermined cross section PC. The fourth angle is an acute angle formed by the up-down line L1 and the line represented by the inner guide plate 11 in the predetermined cross section PC. The fifth angle is an acute angle formed by the left-right line L3 and the line represented by the inner guide plate 11 in the predetermined cross section PC. The inner guide plate 11 is therefore formed along the up-down line L1. According to the present embodiment, the case wall surfaces 1a and 1b surrounding the first case discharge port side space VS50 are formed such that the sixth angle becomes smaller than the seventh angle in a state that both ends of the first case discharge port side space VS50 in the left-right direction D3 of the vehicle are sandwiched between the case wall surfaces 1a and 1b in the predetermined cross section PC. Accordingly, the case wall surfaces 1a and 1b extend upward in the up-down direction D1 of the vehicle from the positions P1 and P2 each including the fan 20. The sixth angle is an acute angle formed by the up-down line L1 and each of the lines L4 and L5 represented by the case wall surfaces 1a and 1b of the air conditioning case 1 surrounding the first case discharge port side space VS50 in the predetermined cross section PC. The seventh angle is an acute angle formed by the left-right line L3 and each of the lines L4 and L5 represented by the case wall surfaces 1a and 1b of the air conditioning case 1 surrounding the first case discharge port side space VS50 in the predetermined cross section PC. The case wall surfaces 1a and 1b surrounding the first case discharge port side space VS50 are therefore formed along the up-down line L1.

Accordingly, in the vehicular air conditioning device 100 of the present embodiment, the air f1 having passed through the first passage VS3 flows in a following manner as shown in FIGS. 4 and 5. The air f1, which is located at a position closer to the rotation axis CL than the blade portions of the fan 20 in the fan space VS5, is guided by the first inner guide surface 11a, and sucked from a space on the left side of the inner guide plate into the fan 20. The air f1 sucked into the fan 20 and blown from the fan 20 in this manner reaches the first case discharge port side space VS50 macroscopically as a rightward flow. More specifically, the air f1 blown from the fan 20 reaches the first case discharge port side space VS50 as a flow mainly constituted by a rightward component. In case of the air f1 blown from the fan 20, a downward component which flows oppositely to the first case discharge port VS6 side (i.e., upper side) is relatively small at least in comparison with the example of FIG. 6. Thereafter, the air f1 smoothly flows upward along the case wall surfaces 1a and 1b formed in the up-down line L1. Accordingly, the air f1 blown from the fan 20 does not increase flow resistance unlike the example of FIG. 6, and flows through the first case discharge port side space VS50 with low flow resistance. According to the vehicular air conditioning device 100 of the present embodiment, therefore, air is allowed to flow with low flow resistance toward the first case discharge port side space VS50 and the first case discharge port VS6 located on the upper side.

Figure 6:
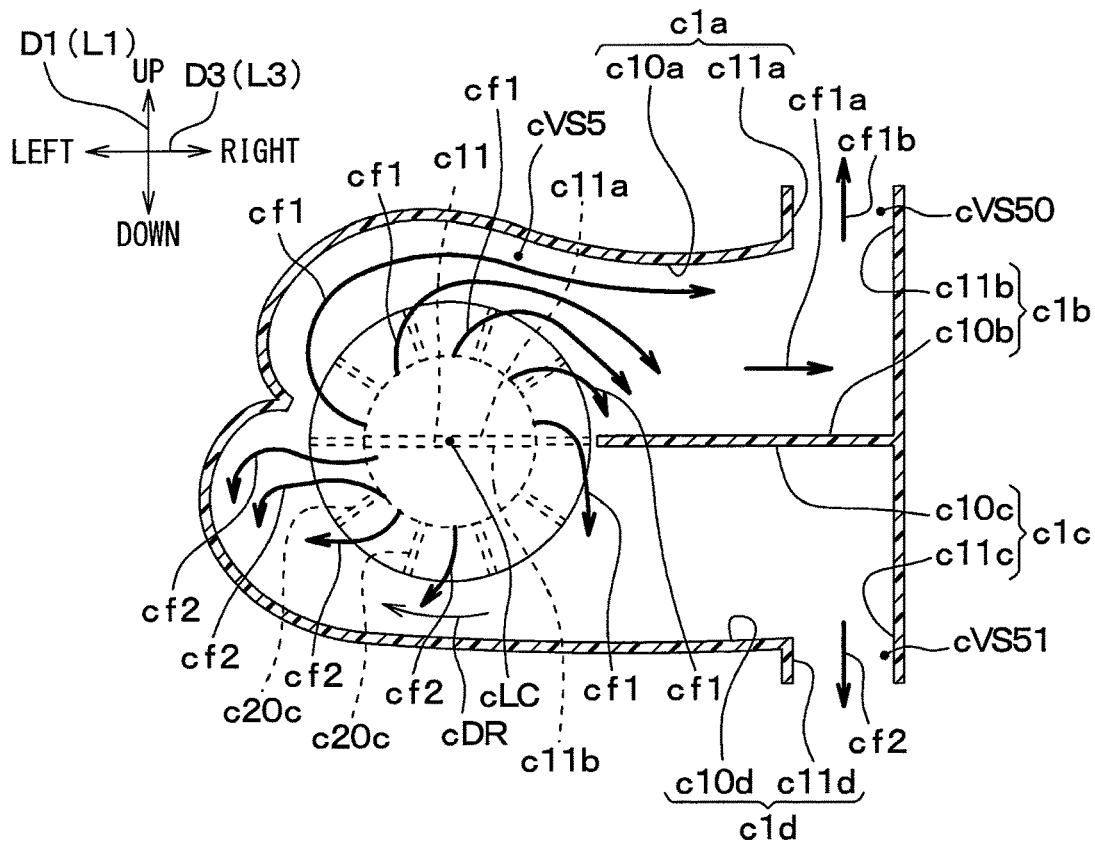
FIG. 6 is a diagram showing a comparative example in correspondence with FIG. 5 according to at least one embodiment of the present disclosure.
Figure 7:
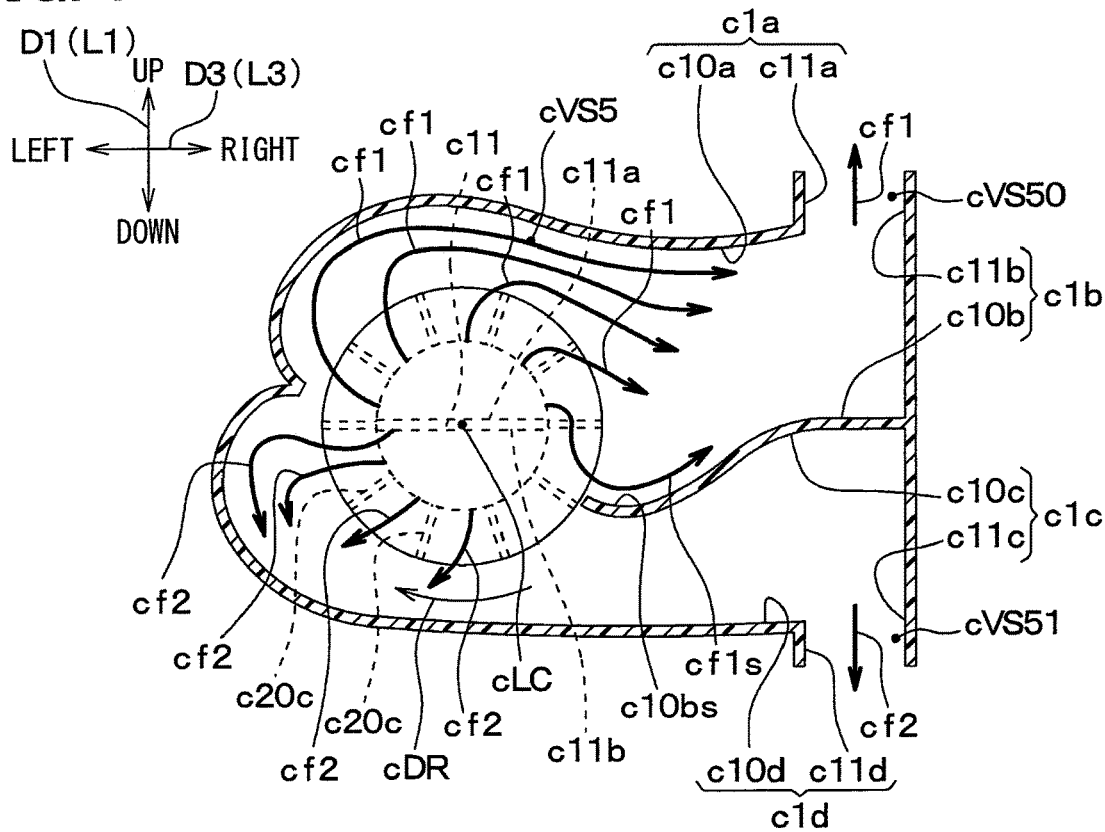
FIG. 7 is a diagram showing a different comparative example in correspondence with FIG. 5 according to at least one embodiment of the present disclosure.

The example of FIG. 6 will be herein described. In the vehicular air conditioning device of Patent Literature 1 described above, the first case discharge port is used as a defroster discharge port, and the second case discharge port is used as a foot discharge port in a certain configuration. In this case, the vehicular air conditioning device feeds conditioned air to the vehicle interior side surface of the windshield of the vehicle by adjusting the temperature and humidity of the outside air introduced into the air conditioning case and blowing the adjusted outside air from the first case discharge port. In addition, the vehicular air conditioning device feeds conditioned air toward a space on the lower side of the interior of the vehicle (i.e., toward lower body of occupant) by adjusting the temperature and humidity of the inside air introduced into the air conditioning case, and blowing the adjusted inside air from the second case discharge port.

When the first case discharge port and the second case discharge port are used as the defroster discharge port and the foot discharge port, respectively, as in this configuration, the first case discharge port (i.e., defroster discharge port) needs to be disposed above the fan to feed an upward flow of the air flowing through the first case discharge port. Accordingly, air flowing through a portion included in the fan space and connected to the first case discharge port (hereinafter referred to as first case discharge port side space) also needs to flow upward. Furthermore, the second case discharge port (i.e., foot discharge port) needs to be disposed below a fan c2 to feed a downward flow of air flowing through the second case discharge port. Accordingly, air flowing through a portion included in the fan space and connected to the second case discharge port (hereinafter referred to as second case discharge port side space) also needs to flow downward.

This type of fan (i.e., centrifugal fan) basically has such a configuration that a width in the direction perpendicular to the rotation axis is larger than a width in the direction of the rotation axis. According to the vehicular air conditioning device described in Patent Literature 1, as described above, the fan is disposed such that the rotation axis extends in the up-down direction of the vehicle. In case of the vehicular air conditioning device described in Patent Literature 1, therefore, the size of the vehicular air conditioning device in the direction perpendicular to the rotation axis of the fan (i.e., left-right direction of vehicle or front-rear direction of vehicle) increases.

Accordingly, the inventor of the present invention has considered the use of the first case discharge port as a defroster discharge port, the use of the second case discharge port as a foot discharge port, and the problem of size increase described above, and other points. The inventor of the present invention has further studied a configuration of the vehicular air conditioning device of Patent Literature 1 which includes the fan c2 disposed such that a rotation axis cCL extends in the front-rear direction of the vehicle. As a result, a configuration shown in FIG. 6 has occurred, and studies have been conducted based on this configuration. The example shown in FIG. 6 basically has the above-described characteristics of the vehicular air conditioning device shown in Patent Literature 1. According to the example shown in FIG. 6, however, the arrangement of the fan c2, the arrangement of the inner guide plate c11, the shapes of the wall surfaces c1a and c1b surrounding the first case discharge port side space cVS50, and the shapes of the wall surfaces c1c and c1d surrounding the second case discharge port side space cVS51 are different from the corresponding arrangements and shapes of Patent Literature 1.

More specifically, in the example shown in FIG. 6, the fan c2 is disposed such that the rotation axis cCL extends in the vehicle front-rear direction (i.e., direction from front side to inner side of FIG. 6) of the vehicle. Accordingly, the rotation axis cCL of the fan c2 extends such that the angle formed by the rotation axis cCL and the front-rear direction of the vehicle becomes smaller than each of the angle formed by the rotation axis cCL and the up-down direction of the vehicle, and the angle formed by the rotation axis cCL and the left-right direction L2 of the vehicle.

In the example shown in FIG. 6, the inner guide plate c11 extends in the left-right direction of the vehicle in the predetermined cross section. More specifically, the inner guide plate c11 extends such that the angle formed by the inner guide plate c11 and the left-right direction of the vehicle becomes smaller than each of the angle formed by the inner guide plate c11 and the up-down direction of the vehicle, and the angle formed by the inner guide plate c11 and the front-rear direction of the vehicle.

In the example shown in FIG. 6, the wall surfaces c1a and c1b surrounding the first case discharge port side space cVS50 are constituted by portions c10a and c11a extending in the left-right direction of the vehicle, and portions c10b and c11b extending in the up-down direction of the vehicle in the predetermined cross section. In other words, the wall surfaces c1a and c1b surrounding the first case discharge port side space cVS50 extend above the fan c2 in a form shown in FIG. 6. More specifically, each of angles formed by lines represented by the wall surfaces c1a and c1b and the left-right direction of the vehicle is smaller than each of angles formed by lines represented by the wall surfaces c1a and c1b and the up-down direction of the vehicle in the predetermined cross section. Moreover, each of angles formed by lines represented by the wall surfaces c1a and c1b and the left-right direction of the vehicle is smaller than each of angles formed by lines represented by the wall surfaces c1a and c1b and the front-rear direction of the vehicle in the predetermined cross section. The wall surfaces c1c and c1d surrounding the second case discharge port side space are constituted by portions c10c and c10d extending in the left-right direction of the vehicle, and portions c11c and c11d extending in the up-down direction of the vehicle in the predetermined cross section. In other words, the wall surfaces c1c and c1d surrounding the second case discharge port side space extend below the fan c2 in a form shown in FIG. 6. More specifically, each of angles formed by lines represented by the wall surfaces c1c and c1d and the left-right direction of the vehicle in the predetermined cross section is smaller than each of angles formed by lines represented by the wall surfaces c1c and c1d and the up-down direction of the vehicle in the predetermined cross section. Moreover, each of angles formed by lines represented by the wall surfaces c1c and c1d and the left-right direction in the predetermined cross section is smaller than each of angles formed by lines represented by the wall surfaces c1c and c1d and the front-rear direction of the vehicle in the predetermined cross section.

In the example shown in FIG. 6, air cf1 blown from the fan c2 reaches the first case discharge port side space cVS50 macroscopically as a downward flow when a rotation direction cDR of the fan c2 is clockwise, for example. More specifically, the air cf1 blown from the fan c2 reaches the first case discharge port side space cVS50 as a flow mainly constituted by a downward component flowing oppositely to a first case discharge port cf1b side (i.e., upper side). The air cf1 flowing downward flows rightward as indicated by an arrow cf1a while colliding with the wall surface c10b surrounding the first case discharge port side space cVS50. The air cf1 flows upward as indicated by an arrow cf1b in a space surrounded by the wall surfaces c11a and c11b, and then is discharged to the outside of the air conditioning case (i.e., vehicle interior side surface of windshield). According to this configuration, the air having a downward component needs to be converted into air having an upward component when passing through the space surrounded by the wall surfaces c11a and c11b. Accordingly, wall surfaces (e.g., c11a and c11b in FIG. 6) extending from the lower side to the upper side need to be formed in the space surrounded by the wall surfaces c10a and c10b or in the space surrounded by the wall surfaces c11a and c11b. This configuration therefore produces such a problem that flow resistance increases by the change of the direction of the air having the downward component to the upward direction. The same problem arises in a case where the rotation direction of the fan c2 is counterclockwise, or in a case where either the first case discharge port or the second case discharge port is located on the left side of the fan c2.

Moreover, in case of this type of vehicular air conditioning device, air sucked into the fan c2 flows toward the radially outside of the fan c2 while flowing in the rotation direction cDR of the fan c2 in a process from suction into the fan c2 to discharge to the outside of the fan c2. In other words, the air flowing inside the fan c2 flows while changing an advancing angle of the air in the period from suction into the fan c2 to discharge to the outside of the fan c2. Accordingly, in the case of the configuration as shown in FIG. 6, a part of the air sucked into the fan c2 through the first passage flows into the second case discharge port side space cVS51 instead of the first case discharge port side space cVS50 by the change of the advancing angle of the air as shown by an arrow cf1s in FIG. 6. For solving this problem, the wall surface c10b in FIG. 6 needs to be made to be a wall surface c10bs curved toward the first case discharge port side space cVS50 as indicated by the wall surface c10bs in FIG. 7. This configuration is not preferable in consideration of not only a complicated structure of the wall surface and difficulty in manufacture, but also increase in flow resistance of air passing through the first case discharge port side space cVS50, for example.

According to the vehicular air conditioning device 100 of the present embodiment, the case wall surfaces 1c and 1d of the air conditioning case 1 surrounding the second case discharge port side space VS51 sandwich both ends of the second case discharge port side space VS51 in the left-right direction D3 of the vehicle in the predetermined cross section PC. The case wall surfaces 1c and 1d extend downward from the positions P1 and P2 in each of which the fan 20 is included in the up-down direction D1 of the vehicle such that the eighth angle becomes smaller than the ninth angle. The eighth angle is an acute angle formed by the up-down line L1 and each of the case wall surfaces 1c and 1d included in the air conditioning case 1 and surrounding the second case discharge port side space VS51 in the predetermined cross section PC. The ninth angle is an acute angle formed by the left-right line L3 and each of the case wall surfaces 1c and 1d included in the air conditioning case 1 and surrounding the second case discharge port side space VS51 in the predetermined cross section PC. The case wall surfaces 1c and 1d surrounding the second case discharge port side space VS51 are therefore formed along the up-down line L1.

Accordingly, the air f2 having passed through the second passage VS4 flows in a following manner as shown in FIGS. 4 and 5. The air f2, which is located in the fan space VS5 at a position closer to the rotation axis CL than the blade portions of the fan 20, is guided by the second inner guide surface 11b, and sucked from a space on the right side of the second inner guide surface 11b into the fan 20. The air f2 sucked into the fan 20 and blown from the fan 20 in this manner reaches the second case discharge port side space VS51 macroscopically as a leftward flow. More specifically, the air f2 blown from the fan 20 reaches the second case discharge port side space VS51 as a flow mainly constituted by a leftward component. In case of the air f2 blown from the fan 20, an upward component which flows oppositely to the second case discharge port VS7 side (i.e., lower side) is relatively small in comparison with at least the example of FIG. 6. Thereafter, the air f2 smoothly flows downward along the case wall surfaces 1c and 1d formed in the up-down line L1. Accordingly, the air f2 blown from the fan 20 does not increase flow resistance unlike the example of FIG. 6, and flows through the second case discharge port side space VS51 and the second case discharge port VS7 with low flow resistance. According to the vehicular air conditioning device 100 of the present embodiment, therefore, air is allowed to flow with low flow resistance toward the second case discharge port side space VS51 and the second case discharge port VS7 located on the lower side.

According to the vehicular air conditioning device 100 of the present embodiment, each of the boundary portions (i.e., portions around P1 and P2) 1e and 1f functions as a nose portion which separates air guided by the first inner guide surface 11a from air guided by the second inner guide surface 11b. The boundary portions 1e and 1f are boundary portions (i.e., portions around P1 and P2) between the case wall surfaces 1a and 1b of the air conditioning case 1 surrounding the first case discharge port side space VS50, and the case wall surfaces 1c and 1d of the air conditioning case 1 surrounding the second case discharge port side space VS51. Accordingly, the boundary portions 1e and 1f extend such that the tenth angle becomes smaller than the eleventh angle in the predetermined cross section PC. The tenth angle is an acute angle formed by the up-down line L1 and each of the boundary portions 1e and 1f in the predetermined cross section PC. The eleventh angle is an acute angle formed by each of the boundary portions 1e and 1f and the left-right line L3 in the predetermined cross section PC. The boundary portions 1e and 1f are therefore formed along the up-down line L1.

Accordingly, the nose portions (i.e., boundary portions 1e and 1f) of the vehicular air conditioning device 100 of the present embodiment can highly accurately separate two types of air having different properties from each other in accordance with the change of the advancing angle. More specifically, the air f1 introduced into the fan 20 through the first passage VS3 and the air f2 introduced into the fan 20 through the second passage VS4 can be highly accurately separated. Moreover, the boundary portions 1e and 1f are formed along the up-down line L1, wherefore flow resistance to air flowing in contact with the boundary portions 1e and 1f also decreases.

According to the vehicular air conditioning device 100 of the present embodiment, the first passage VS3 is located on the left side of the partition plate 10, while the second passage VS4 is located on the right side of the partition plate 10. The first inner guide surface 11a is located on the left side of the second inner guide surface 11b.

Accordingly, connection between the first inner guide surface 11a side space and the first passage VS3 in the fan space VS5, and connection between the second inner guide surface 11b side space and the second passage VS4 in the fan space VS5 are smoothly made. In this case, the first inner guide surface 11a side space, the first passage VS3, and the second inner guide surface 11b side space can be smoothly connected without twisting the first passage VS3 and the second passage VS4. According to the vehicular air conditioning device 100 of the present embodiment, therefore, air having passed through the first passage VS3 can flow with low flow resistance toward the first case discharge port side space VS50 and the first case discharge port VS6 via the first inner guide surface 11a. Moreover, air having passed through the second passage VS4 can flow with low flow resistance toward the second case discharge port side space VS51 and the second case discharge port VS7 via the second inner guide surface 11*b*.

According to the vehicular air conditioning device 100 of the present embodiment, the case introduction port VS1*a* is a port through which air outside the vehicle is introduced, while the second case introduction port VS 2 is a port through which air inside the vehicle is introduced. The first case discharge port VS6 is a defroster discharge port, while the second case discharge port VS7 is a foot discharge port.

Accordingly, the vehicular air conditioning device 100 of the present embodiment is particularly effective. A reason for this effectiveness will be detailed below. Equipment such as a steering wheel and instruments is provided on the driver's seat side in the vehicle, wherefore only a little space is left unoccupied in this area. Accordingly, the vehicular air conditioning device 100 is generally disposed in an area on the front passenger seat side in the vehicle (i.e., left side area), more specifically, inside a dashboard. In this case, the right side of the vehicular air conditioning device 100 is the driver's seat (steering wheel) side, while the left side is the front passenger seat. Moreover, for introducing the outside air into the air conditioning case, the outside air needs to be introduced from the outside of the vehicle into the inside of the vehicle, and fed to the air conditioning case. For this purpose, a duct communicating with the outside of the vehicle needs to be equipped inside the vehicle. A duct communicating with the outside of the vehicle is long or complicated in structure, and therefore requires a wide space. Meanwhile, for introducing the inside air into the air conditioning case, a duct communicating with the interior of the vehicle is equipped. In this case, a relatively short and simple duct is only needed. As described above, only a little space is left unoccupied on the driver's seat side. Accordingly, the first case introduction port (i.e., introduction port through which outside air is introduced) VS1*a* is preferably disposed on the front passenger seat side, while the second case introduction port (i.e., introduction port through which inside air is introduced) VS2 is preferably disposed on the driver's seat side. For the foregoing reason, the vehicular air conditioning device 100 according to the present embodiment is particularly effective. In more detail, the vehicular air conditioning device 100 introduces the outside air from the first case introduction port VS1*a* located on the left side, and feeds the outside air toward the first case discharge port side space VS50 and the first case discharge port VS6 via the first passage VS3 located on the left side. The vehicular air conditioning device 100 further introduces the inside air from the second case introduction port VS2 located on the right side, and feeds the inside air toward the second case discharge port side space VS51 and the second case discharge port VS7 via the second passage VS4 located on the right side.

The vehicular air conditioning device 100 according to the present embodiment further includes the revolving door 18 which switches the degree of communication between the first case discharge port VS6 and the second case discharge port VS7.

Accordingly, the vehicular air conditioning device 100 of the present embodiment can selectively use a mode which blows both air reaching the first case discharge port VS6 via the first case discharge port side space VS50, and air reaching the second case discharge port VS7 via the second case discharge port side space VS51, or a mode which blows only either one of these airs in accordance with purposes of use (e.g., temperature, humidity, air amount).

Other Embodiments

The present disclosure is not limited to the above-described embodiment, but may be modified in appropriate manners.

Figure 13:
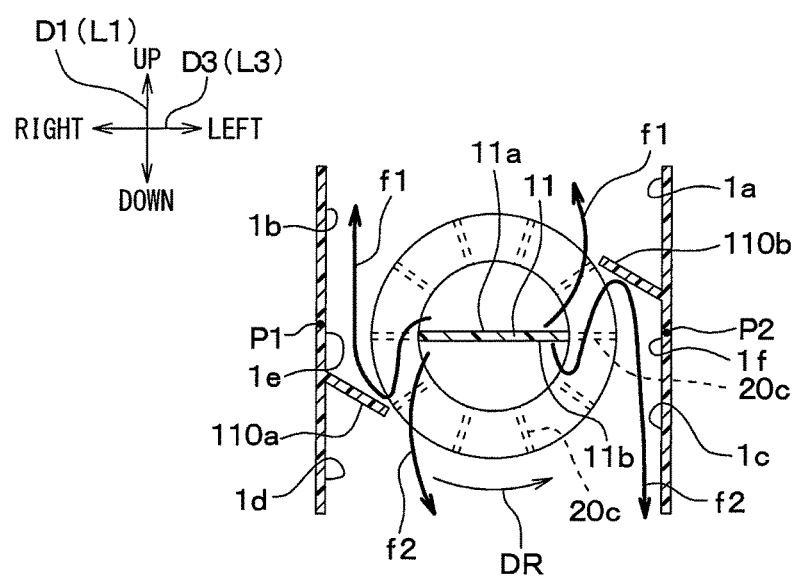
FIG. 13 is a diagram showing a vehicular air conditioning device according to another embodiment in correspondence with FIG. 5 according to at least one embodiment of the present disclosure.

For example, in the above-described embodiment, outer guide plates 110*a* and 110*b* may be disposed on the outside of the plurality of blade portions 20*c* in the radial direction DD of the fan 20 in the fan space VS5 (i.e., on the side away from rotation axis CL) as shown in FIG. 13. In other words, air guided by the first inner guide surface 11*a* may be further guided to the first case discharge port VS6 by the outer guide plate 110*a*. Similarly, air guided by the second inner guide surface 11*b* may be further guided to the second case discharge port VS7 by the outer guide plate 110*b*. At this time, each of these outer guide plates is preferably disposed such that the line represented by the outer guide plate crosses the first inner guide surface 11*a* or the second inner guide surface 11*b* at a substantially right angle in the predetermined cross section PC.

According to the above-described embodiment, the first case introduction ports VS1*a* and VS1*b* are located at positions shifted from the second case introduction port VS2 only on one side in the left-right direction of the vehicle. However, the first case introduction ports VS1*a* and VS1*b* may be shifted from the second case introduction port VS2 to one side in the left-right direction of the vehicle, shifted from the second case introduction port VS2 to one side in the up-down direction of the vehicle, and shifted to one side in the front-rear direction of the vehicle.

SUMMARY

A first aspect shown in part or all of the above embodiments is directed to a vehicular air conditioning device mounted on a vehicle to feed conditioned air to an interior of the vehicle, the vehicular air conditioning device includes: an air conditioning case that includes a first case introduction port and a second case introduction port through each of which air is introduced, and a first case discharge port and a second case discharge port through each of which the introduced air is discharged; and a fan that includes a plurality of blade portions disposed with a clearance left between each other, and rotates around a rotation axis inside the air conditioning case to suck air and blow out the air in a direction away from the rotation axis. The first case introduction port is located at a position shifted from the second case introduction port to one side in a left-right direction of the vehicle. The first case discharge port is located at a position shifted upward in an up-down direction of the vehicle from the rotation axis. The second case discharge port is located at a position shifted downward in the up-down direction of the vehicle from the rotation axis. The air conditioning case includes a partition plate disposed on an air flow upstream side of the fan, and an inner guide plate disposed inside the plurality of blade portions in a radial direction around the rotation axis. The partition plate partitions a space on an air flow upstream side of the fan into a first passage located on the one side of the partition plate in the left-right direction of the vehicle, and a second passage located on the other side of the partition plate in the left-right direction of the vehicle. The first passage communicates with the first case introduction port. The second passage communicates with the second case introduction port. The inner guide plate has a first inner guide surface and a second inner guide surface. The first inner guide surface is located on the one side of the second inner guide plate in the left-right direction of the vehicle. Air introduced from the first case introduction port is guided by the first inner guide surface from the first passage, is sucked into the fan, is blown upward by the fan, and further flows to the first case discharge port. Air introduced from the second case introduction port is guided by the second inner guide surface from the second passage, is sucked into the fan, is blown downward by the fan, and further flows to the second case discharge port.

According to a second aspect, the fan is disposed in a ventilation space, and rotates around the rotation axis to suck air in a direction of the rotation axis and blow the air away from the rotation axis. The air conditioning case includes a case wall surface that surrounds a fan space where the fan is disposed. The air conditioning case includes the inner guide plate. The air conditioning case includes the ventilation space. The first passage and the first passage communicate with the fan space. The partition plate partitions a part of the ventilation space into the first passage and the second passage. An acute angle formed by the rotation axis and a front-rear direction of the vehicle is smaller than each of an acute angle formed by the rotation axis and the up-down direction of the vehicle, and an acute angle formed by the rotation axis and the left-right direction of the vehicle. The fan space includes a first case discharge port side space connected to the first case discharge port, and a second case discharge port side space connected to the second case discharge port. In a predetermined cross section taken along a plane parallel to the up-down direction and the left-right direction and including a region where the fan is positioned, an acute angle formed by the up-down direction and a line that passes through the rotation axis and passes through an outer end of the inner guide plate in the radial direction is smaller than an acute angle formed by the left-right direction and the line. In the predetermined cross section, portions included in the case wall surface and surrounding the first case discharge port side space extend upward in the up-down direction from positions in each of which the fan is included in the up-down direction in a state that both ends of the first case discharge port side space in the left-right direction are sandwiched between the portions.

According to a third aspect, in the predetermined cross section, the wall surface of the air conditioning case surrounding the second case discharge port side space extends downward in the up-down direction from the positions in each of which the fan is included in the up-down direction in a state that both ends of the second case discharge port side space in the left-right direction are sandwiched between the portions such that the eighth angle becomes smaller than the ninth angle. The eighth angle is an acute angle formed by the up-down line and the wall surface of the air conditioning case surrounding the second case discharge port side space in the predetermined cross section. The ninth angle is an acute angle formed by the left-right line and the wall surface of the air conditioning case 1 and surrounding the second case discharge port side space in the predetermined cross section.

According to the vehicular air conditioning device, therefore, air passing through the second passage and blown from the fan reaches the first case discharge port side space macroscopically as a rightward flow. More specifically, the air blown from the fan reaches the second case discharge port side space as a flow mainly constituted by a rightward component. Concerning the air blown from the fan, an upward component which flows oppositely to the second case discharge port side (i.e., upper side) is relatively small in comparison with at least the example of FIG. 6. Thereafter, this air smoothly flows downward along the wall surface formed in the up-down line. Accordingly, the air blown from the fan does not increase flow resistance unlike the example of FIG. 6, and flows with low flow resistance through the second case discharge port side space and the second case discharge port. According to this vehicular air conditioning device, therefore, air is allowed to flow with low flow resistance toward the second case discharge port side space and the second case discharge port located on the lower side.

According to a fourth aspect, a boundary portion between the wall surface of the air conditioning case surrounding the first case discharge port side space and the wall surface of the air conditioning case surrounding the second case discharge port space functions as a nose portion that separates air guided by the first inner guide surface from air guided by the second inner guide surface. Accordingly, the boundary portion extends such that the tenth angle becomes smaller than the eleventh angle in the predetermined cross section. The tenth angle is an acute angle formed by the up-down line and the boundary portion in the predetermined cross section. The eleventh angle is an acute angle formed by the left-right line and the boundary portion in the predetermined cross section. The boundary portion is therefore formed along the up-down line.

According to this vehicular air conditioning device, therefore, the nose portion (i.e., boundary portion described above) can highly accurately separate two types of air having different properties from each other (i.e., air introduced into fan via first passage and air introduced to fan via second passage) in accordance with a change of the advancing angle described above. Moreover, the boundary portion is formed along the up-down line, wherefore flow resistance to air flowing in contact with the boundary portion also decreases.

According to a fifth aspect, the first passage is located on the left side of the partition plate, while the second passage is located on the right side of the partition plate. The first inner guide surface is located on the left side of the second inner guide surface.

According to this vehicular air conditioning device, therefore, connection between the first inner guide surface side space and the first passage in the fan space, and connection between the second inner guide surface side space and the second passage in the fan space are smoothly made. In this case, the first inner guide surface side space, the first passage, and the second inner guide surface side space can be smoothly connected without twisting the first passage and the second passage. According to the vehicular air conditioning device, therefore, air having passed through the first passage can flow with low flow resistance toward the first case discharge port side space and the first case discharge port via the first inner guide surface. Moreover, air having passed through the second passage can flow with low flow resistance toward the second case discharge port side space and the second case discharge port via the second inner guide surface.

According to a sixth aspect, the first case introduction port is a port through which air outside the vehicle is introduced. The second case introduction port is a port through which air inside the vehicle is introduced. The first case discharge port is a defroster discharge port, while the second case discharge port is a foot discharge port.

Accordingly, this vehicular air conditioning device is particularly effective. A reason for this effectiveness will be detailed below. Equipment such as a steering wheel and instruments is provided on the driver's seat side in the vehicle, wherefore only a little space is left unoccupied in this area. Accordingly, the vehicular air conditioning device is generally disposed in an area on the front passenger seat side in the vehicle (i.e., left side area), more specifically, inside a dashboard. In this case, the right side of the vehicular air conditioning device is the driver's seat (i.e., steering wheel side), while the left side is the front passenger seat. For introducing the outside air into the air conditioning case, the outside air needs to be introduced from the outside of the vehicle into the inside of the vehicle, and fed to the air conditioning case. For this purpose, a duct communicating with the outside of the vehicle needs to be equipped inside the vehicle. A duct communicating with the outside of the vehicle is long or complicated in structure, and therefore requires a wide space. Meanwhile, for introducing the inside air into the air conditioning case, a duct communicating with the interior of the vehicle is equipped. In this case, a relatively short and simple duct is only needed. As described above, only a little space is left unoccupied on the driver's seat side. Accordingly, the first case introduction port (i.e., introduction port through which outside air is introduced) is preferably disposed on the front passenger seat side, while the second case introduction port (i.e., introduction port through which inside air is introduced) is preferably disposed on the driver's seat side. Accordingly, the vehicular air conditioning device which is configured to introduce outside air from the first case introduction port located on the left side, and feed the outside air to the first case discharge port side space and the first case discharge port via the first passage located on the left side, and to introduce inside air from the second case introduction port on the right side, and feed the inside air to the second case discharge port side space and the second case discharge port via the second passage located on the right side is particularly effective.

According to a seventh aspect, the vehicular air conditioning device includes a revolving door that switches a degree of communication between the first case discharge port and the second case discharge port.

Accordingly, the vehicular air conditioning device can selectively use a mode which blows both air reaching the first case discharge port via the first case discharge port side space, and air reaching the second case discharge port via the second case discharge port side space, or a mode which blows only either one of these airs in accordance with purposes of use (e.g., temperature, humidity, air amount).

What is claimed is:

1. A vehicular air conditioning device mounted on a vehicle to feed conditioned air to an interior of the vehicle, the vehicular air conditioning device comprising:
    an air conditioning case that includes
        a first case introduction port and a second case introduction port through each of which air is introduced, and
        a first case discharge port and a second case discharge port through each of which the introduced air is discharged; and
    a fan that includes a plurality of blade portions arranged at intervals, and rotates about a rotation axis inside the air conditioning case to draw the air and blow out the air in a direction away from the rotation axis, wherein
    the first case introduction port is offset to one side in a left-right direction of the vehicle relative to the second case introduction port,
    the first case discharge port is offset upward in an up-down direction of the vehicle relative to the rotation axis,
    the second case discharge port is offset downward in the up-down direction of the vehicle relative to the rotation axis,
    the air conditioning case includes
        a partition plate disposed on an air flow upstream side of the fan, and
        an inner guide plate disposed inside the plurality of blade portions in a radial direction around the rotation axis,
    the partition plate partitions a space on an air flow upstream side of the fan into a first passage located on the one side of the partition plate in the left-right direction of the vehicle, and a second passage located on an other side of the partition plate in the left-right direction of the vehicle,
    the first passage communicates with the first case introduction port, and the second passage communicates with the second case introduction port,
    the inner guide plate has a first inner guide surface and a second inner guide surface, the first inner guide surface being located on one side of the second inner guide surface in the left-right direction of the vehicle,
    the air introduced through the first case introduction port is guided by the first inner guide surface to be drawn from the first passage into the fan, the air being blown upward by the fan to flow through the first case discharge port, and
    the air introduced through the second case introduction port is guided by the second inner guide surface to be drawn from the second passage into the fan, the air being blown downward by the fan to flow through the second case discharge port.

2. The vehicular air conditioning device according to claim 1, wherein,
    the fan is disposed in a ventilation space, and rotates about the rotation axis to draw the air in an axial direction of the rotation axis and to blow the air away from the rotation axis,
    the air conditioning case defines the ventilation space, and includes a case wall surface that defines a fan space where the fan is disposed,
    an acute angle formed by the rotation axis and a front-rear direction of the vehicle is smaller than each of an acute angle formed by the rotation axis and the up-down direction of the vehicle, and an acute angle formed by the rotation axis and the left-right direction of the vehicle,
    the fan space includes a first case discharge port side space connected to the first case discharge port, and a second case discharge port side space connected to the second case discharge port,
    the first case discharge port side space is located above the fan in the up-down direction of the vehicle,
    the second case discharge port side space is located below the fan in the up-down direction of the vehicle,
    in a predetermined cross section taken along a plane parallel to the up-down direction and the left-right direction and including a region where the fan is positioned, an acute angle formed by the up-down direction and a line that passes through the rotation axis and passes through an outer end of the inner guide plate in the radial direction is smaller than an acute angle formed by the left-right direction and the line that passes through the rotation axis and passes through the outer end of the inner guide plate in the radial direction, and in the predetermined cross section, portions of the case wall surface defining the first case discharge port side space extend upward in the up-down direction from positions in each of which the fan is included, the portions of the case wall surface sandwiching both ends of the first case discharge port side space in the left-right direction.

3. The vehicular air conditioning device according to claim 2, wherein
in the predetermined cross section, portions of the case wall surface defining the second case discharge port side space extend downward in the up-down direction from the positions in each of which the fan is included, the portions of the case wall surface sandwiching both ends of the second case discharge port side space in the left-right direction.

4. The vehicular air conditioning device according to claim 2, wherein,
a boundary between the portion of the case wall surface defining the first case discharge port side space and the portion of the case wall surface defining the second case discharge port side space function as a nose portion that separates the air guided by the first inner guide surface from the air guided by the second inner guide surface, and
in the predetermined cross section, an acute angle formed by the up-down direction and a direction in which the boundary portion extends is smaller than an acute angle formed by the left-right direction of the vehicle and the boundary portion.

5. The vehicular air conditioning device according to claim 1, wherein
the first passage is located on the left side of the partition plate in the left-right direction,
the second passage is located on the right side of the partition plate in the left-right direction, and
the first inner guide surface is located on the left side of the second inner guide surface in the left-right direction.

6. The vehicular air conditioning device according to claim 1, wherein
the first case introduction port is a port through which air outside the vehicle is introduced,
the second case introduction port is a port through which air inside the vehicle is introduced,
the first case discharge port is a defroster discharge port, and
the second case discharge port is a foot discharge port.

7. The vehicular air conditioning device according to claim 1, further comprising:
a switching unit that switches a degree of communication between the first case discharge port and the second case discharge port.

* * * * *